(12) United States Patent
Morris et al.

(10) Patent No.: US 9,766,933 B2
(45) Date of Patent: *Sep. 19, 2017

(54) FINE-GRAINED CAPACITY MANAGEMENT OF COMPUTING ENVIRONMENTS THAT MAY SUPPORT A DATABASE

(75) Inventors: John Mark Morris, San Diego, CA (US); P. Keith Muller, San Diego, CA (US); Douglas P. Brown, Rancho Santa Fe, CA (US)

(73) Assignee: Teradata US, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/309,806

(22) Filed: Dec. 2, 2011

(65) Prior Publication Data

US 2013/0086374 A1  Apr. 4, 2013

Related U.S. Application Data

(63) Continuation-in-part of application No. 13/249,922, filed on Sep. 30, 2011.

(51) Int. Cl.
  *G06F 7/00* (2006.01)
  *G06F 17/00* (2006.01)
  *G06F 17/30* (2006.01)
  *G06F 9/50* (2006.01)

(52) U.S. Cl.
  CPC ...... *G06F 9/5011* (2013.01); *G06F 2209/504* (2013.01); *Y02B 60/142* (2013.01)

(58) Field of Classification Search
  CPC ......... G06F 17/30463; G06F 17/30474; G06F 17/30306; G06F 17/30433; G06F 17/30442; G06F 17/30545; G06F 17/30557; G06F 17/30; G06F 17/30289; G06F 17/30469; G06F 17/30471; G06F 17/30477; G06F 17/3056
  USPC ..... 709/105, 203, 226; 718/104, 105; 705/7, 705/34, 7.26, 8; 707/707; 726/12
  See application file for complete search history.

(56) References Cited

U.S. PATENT DOCUMENTS

| | | | |
|---|---|---|---|
| 6,574,605 B1* | 6/2003 | Sanders et al. | 705/7.26 |
| 6,980,552 B1* | 12/2005 | Belz | H04L 12/5693 370/392 |
| 7,395,537 B1* | 7/2008 | Brown | G06F 17/30306 707/999.001 |
| 7,657,501 B1* | 2/2010 | Brown et al. | 707/999.002 |
| 7,685,633 B2* | 3/2010 | Ben-Shachar et al. | 726/12 |
| 7,693,847 B1* | 4/2010 | Brown et al. | 707/694 |

(Continued)

*Primary Examiner* — Susan Chen
(74) *Attorney, Agent, or Firm* — Ramin Mahboubian

(57) ABSTRACT

Computing capacity of a computing environment can be managed by controlling it associated processing capacity based on a target (or desired) capacity. In addition, fine-grained control over the processing capacity can be exercised. For example, a computing system can change the processing capacity (e.g., processing rate) of at least one processor operating based on a target capacity. The computing system may also be operable to change the processing capacity based on a measured processing capacity (e.g., a measured average of various processing rates of a processor taken over a period of time when a processor may have been operating at different processing rates over that period). By way of example, the processing rate of a processor can be switched between 1/8 and 2/8 of a maximum processing rate to achieve virtually any effective processing rates between them.

17 Claims, 17 Drawing Sheets

(56) References Cited

U.S. PATENT DOCUMENTS

| | | | |
|---|---|---|---|
| 7,693,897 B2* | 4/2010 | Bugir et al. | 707/707 |
| 8,046,767 B2* | 10/2011 | Rolia et al. | 718/104 |
| 2002/0114296 A1* | 8/2002 | Hardy | H04L 12/2602 370/332 |
| 2002/0198629 A1* | 12/2002 | Ellis | G06Q 50/06 700/286 |
| 2005/0223191 A1* | 10/2005 | Ferris | G06F 9/45537 712/28 |
| 2006/0026179 A1* | 2/2006 | Brown | G06F 17/30306 |
| 2007/0100793 A1* | 5/2007 | Brown | G06F 17/30557 |
| 2007/0271242 A1* | 11/2007 | Lindblad | 707/3 |
| 2008/0062890 A1* | 3/2008 | Temple | G06F 9/505 370/254 |
| 2008/0221941 A1* | 9/2008 | Cherkasova et al. | 705/7 |
| 2009/0132536 A1* | 5/2009 | Brown | G06F 17/3056 |
| 2010/0162251 A1* | 6/2010 | Richards | G06F 17/30442 718/102 |
| 2010/0250748 A1* | 9/2010 | Sivasubramanian et al. | 709/226 |
| 2010/0324962 A1* | 12/2010 | Nesler et al. | 705/8 |
| 2011/0173109 A1* | 7/2011 | Synesiou et al. | 705/34 |

* cited by examiner

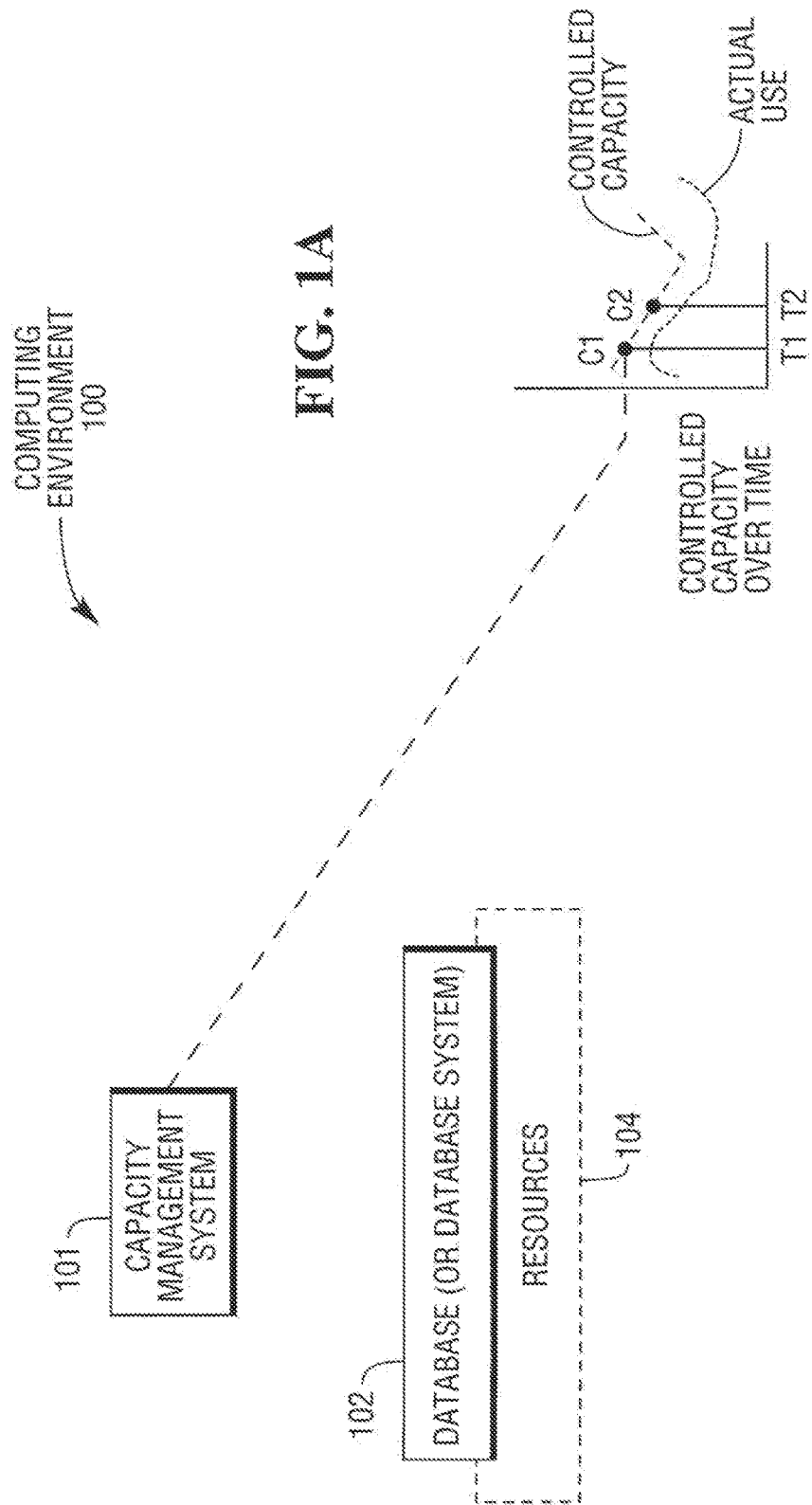

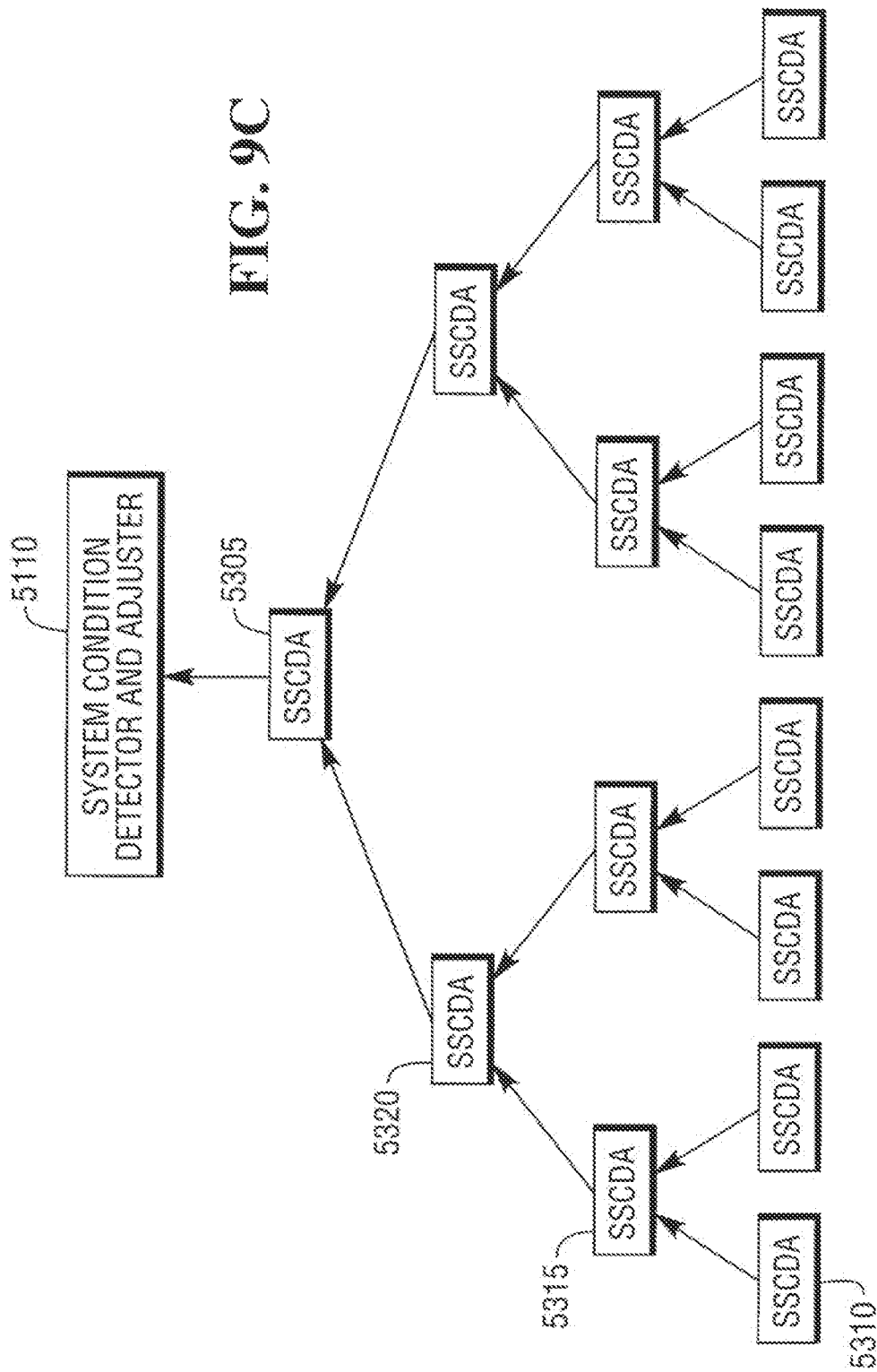

FINE-GRAINED CAPACITY MANAGEMENT OF COMPUTING ENVIRONMENTS THAT MAY SUPPORT A DATABASE

CROSS-REFERENCE TO RELATED APPLICATIONS

This is a Continuation in Part of the U.S. patent application Ser. No. 13/249,922 entitled: "REGULATING CAPACITY AND MANAGING SERVICES OF COMPUTING ENVIRONMENTS AND SYSTEMS THAT INCLUDE A DATABASE," filed on Sep. 30, 2011, which is hereby incorporated by reference herein in its entirety and for all purposes."

BACKGROUND

The term database can refer to a collection of data and/or data structures typically stored in a digital form. Data can be stored in a database for various reasons and to serve various entities or "users." Generally, data stored in the database can be used by the database users. A user of a database can, for example, be a person, a database administrator, a computer application designed to interact with a database, etc. A very simple database or database system can, for example, be provided on a Personal Computer (PC) by storing data on a Hard Disk (e.g., contact information) and executing a computer program that allows access to the data. The executable computer program can be referred to as a database program or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and some databases that are for various business and organizations (e.g., banks, retail stores, governmental agencies, universities) in use today can be very complex and support several users simultaneously by providing very complex queries (e.g., give me the name of all customers under the age of thirty five (35) in Ohio that have bought all items in a list of items in the past month in Ohio and also have bought ticket for a baseball game in San Diego and purchased a baseball in the past 10 years).

Typically, a Database Management System (DBMS) is provided for relatively large and/or complex database. As known in the art, a DBMS can effectively manage the database or data stored in a database, and serve as an interface for the users of the database. A DBMS can be provided as an executable computer program (or software) product as also known in the art.

It should also be noted that a database can be organized in accordance with a Data Model. Notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation language, and a Query Language.

Today, databases have become prevalent in virtually all aspects of business and personal life. Moreover, database use is likely to continue to grow even more rapidly and widely across all aspects of commerce. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity. In either case, however, there is a need for a flexible database environment that can adjust better to the needs of it users and also allow the capacity of the database to change as the need of its users change.

One important aspect of capacity of a computing environment is its processing capacity (e.g., processing rate of one or more processors operating in a computing system and/or computing environment). The processing capacity can, for example, be expressed as a clock rate (also may be referred to as a clock cycle or even a clock speed). A clock rate can, for example, be expressed in cycles per second (e.g., measured in Hertz) or as the frequency of the clock in any synchronous circuit, such as a central processing unit (CPU). A crystal oscillator frequency reference can be synonymous with a fixed sinusoidal waveform. A clock rate can be considered the frequency reference translated by electronic circuitry (AD Converter) into a corresponding square wave pulse. In computers available today, a single clock cycle can be shorter than a nanosecond in modern non-embedded microprocessors, toggling between a logical zero and a logical one state.

In view of the foregoing, improved techniques for controlling the capacity for computing environments or systems that include a database would be useful. In particular, improved techniques for controlling the processing capacity of the computing environments that include a database would be very useful.

SUMMARY

Broadly speaking, the invention relates to computing systems and computing environments. More particularly, the invention pertains to techniques for managing the processing capacity of computing environments, including those that provide a database.

In accordance with one aspect of the invention, the computing capacity of a computing environment can be managed by controlling it associated processing capacity based on a target (or desired) capacity. In addition, fine-grained control over the processing capacity can be exercised in accordance with another aspect of the invention.

The invention can be implemented in numerous ways, including, for example, a method, an apparatus, a computer readable medium, a database system, and a computing system (e.g., a computing device). A computer readable medium can, for example, include at least executable program code stored in a tangible or non-transient form. Several embodiments of the invention are discussed below.

In accordance with one embodiment of the invention, a computing system can change the processing capacity (e.g., processing rate) of at least one processor operating in a computing environment at least partly based on a target capacity of the computing environment. The computing system may also be operable to change the processing capacity based on a measured processing capacity (e.g., a measured average of processing rates taken over a period of time when a processor may have been operating at different processing rates over that period). By way of example, the processing rate of a processor can be switched between one eighth (1/8) and two eighth (2/8) of is maximum processing rates to achieve virtually any effective processing rates between one eighth (1/8) and two eighth (2/8) of maximum processing rate.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1A depicts a computing environment including a capacity management system provided for a database (or a database system) in accordance with one embodiment of the invention.

FIG. 9C depicts an arrangement for handling inputs and outputs to and from a SCDA in accordance with one embodiment of the invention.

DETAILED DESCRIPTION

Figure 1B:
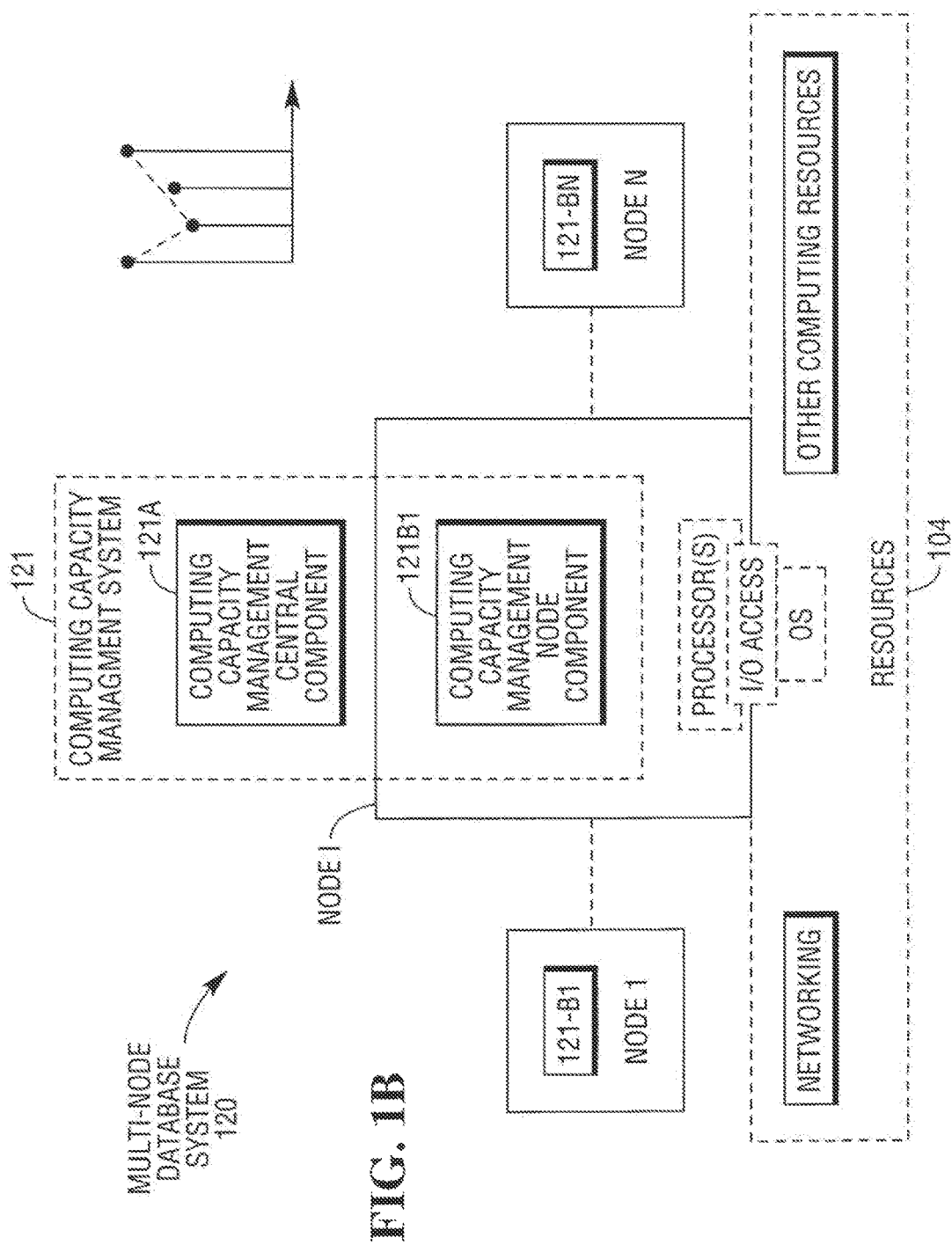
FIG. 1B depicts a multi-node database system, including a computing capacity management system in accordance with one embodiment of the invention.

As noted in the background section, databases have become prevalent in virtually all aspects of business and personal life. Moreover, database use is likely to grow even more rapidly and widely across all aspects of commerce. Generally, databases and DBMS that manage them can be very large and extremely complex, partly in order to support an ever increasing need to store data and analyze data. Typically, larger databases are used by larger organizations. Larger databases are supported by a relatively large amount of capacity, including computing capacity (e.g., processor, memory, Input and Output (I/O) capabilities) to allow them to perform many tasks and/or complex tasks effectively at the same time (or in parallel). On the other hand, smaller databases systems are also available today and can, for example, be used by smaller organizations. In contrast to larger databases, smaller databases can operate with less capacity. In either case, however, there is a need for a flexible database environment that can adjust better to the needs of it users.

Accordingly, techniques for controlling the capacity for computing environments or systems that include a database are needed. In particular, techniques for controlling the capacity of database systems would be very useful, especially given the prevalence of the database systems in various aspects of business and life in the world today.

Furthermore, it is likely that the use of databases will still continue to grow rapidly to serve an even wider range of entities with widely differing needs and requirements. Hence, it would be useful to control the capacity of computing environments or systems that include a database. In particular, it would be very useful to allow the capacity of a database to change as desired or needed. In other words, it would be very useful to provide a database system that can change its capacity or ability to perform various database related tasks, activities, etc. (or "database work"). For example, the ability to rapidly upgrade hardware resources (e.g., number of database nodes and their corresponding processors) in what may be budget-friendly increments to customers or purchasers of a database is highly desirable and useful. It would also be useful to provide capacity controlled environment for a database system capacity to, for example provide capacity to users, customers and/or purchasers of database as desired or needed (e.g., providing Capacity on Demand (COD)). It would also be useful to manage the excess capacity (e.g., the capacity not configured for use or regular use by a database system).

Energy conservation or heat dissipation techniques (e.g., Clock Stop) are primarily intended for covering energy and minimization heat rather than controlling the capacity of computing environment based on a target or desired capacity. Furthermore, these techniques are limited with respect to the granularity of the processing capacities they can achieve.

One such technology is SpeedStep™ which is a trademark for a series of dynamic frequency scaling technologies (codenamed Geyserville and including SpeedStep™, SpeedStep II™, and SpeedStep III™) built into some Intel microprocessors that allow the clock speed of the processor to be changed by software. This can allow a processor to meet the instantaneous performance needs of the operation being performed, while minimizing power draw and heat dissipation.

However, as noted above, SpeedStep™ is aimed at minimizing power draw and heat dissipation. Furthermore, SpeedStep™ does not allow fine grain control of the processing rates as, for example, One (1) to seven (7) of every eight (8) clock cycles may be skipped. This only provides for a 12.5% increment in CPU cycles. More recent technologies may allow One (1) to fifteen (15) of every sixteen (16) clock cycles to be skipped, thereby allowing 6.25% increments. As such, many processing rates and incremental to processing rates (e.g., 12%, 15.5%, 17.8%, 19.01%, 20%, 23.001%, 30%, 49.5%, 55.998%, 78.51%, 89.99%) still remain unattainable.

As such, it will be appreciated that the fine-grained control over the processing capacity of computing environments can be achieved by the techniques provided in accordance with the invention. The techniques also allow find-grained control to be exercised based on a target processing capacity (e.g., regardless of the input or demand for processing).

In accordance with one aspect of the invention, the computing capacity of a computing environment can be managed by controlling it associated processing capacity based on a target (or desired) capacity. In addition, fine-grained control over the processing capacity can be exercised in accordance with another aspect of the invention.

Embodiments of these aspects of the invention are also discussed below with reference to FIGS. 1A-12. However, those skilled in the art will readily appreciate that the detailed description given herein with respect to these figures is for explanatory purposes as the invention extends beyond these limited embodiments.

FIG. 1A depicts a computing environment 100 including a capacity management system 101 provided for a database (or a database system) 102 in accordance with one embodiment of the invention. Although not shown in FIG. 1A, it should be noted that the database or database system 102 can also include a Data Base Management System (DBMS). Those skilled in the art will readily appreciate that the capacity management system 101 can be provided by hardware and/or software. For example, the capacity management system 101 can be provided as executable code stored on a computer storage medium (not shown) that can be read and executed by one or more processors (not shown).

As will be described in more detail below, the capacity management system 101 can control the capacity of the database 102. As such, the capacity management system 101 can, for example, be operable to change, vary, and/or maintain the capacity of the database 102 in a controlled manner. Although depicted as a component separate from the database 102, it should be noted that the capacity management system 101 may partially or entirely be implemented as a part of the database (or database system) 102 as will be appreciated and readily understood by those skilled in the art. In particular, it will be appreciated that the capacity management system 101 can be provided at least in part in or by a DBMS (not shown in FIG. 1A).

Referring to FIG. 1A, generally, capacity management system 101 can use one or more resources 104 in order to process data or requests associated with the database 102. The resources 104 can, for example include processors, memory, access to various services and functions (e.g., Input and Output (I/O) operations, including reading and writing of the data to and from the database 102).

As will be appreciated by those skilled in the art, the resources 104 may be a part of the database 102 or be a part of a larger computing environment or system, namely the computing environment 100. Also, the database 102 can include one or more database nodes, each including one or more processors operable to process data which is typically stored in a computer readable storage medium (e.g., a hard disk). It should be noted that the processor(s) and the computer readable storage medium of a database node may be a part of the resources 104.

The database 102 may, for example, be a conventional database operable to perform conventional functions. As such, the database 102 can be a database system with multiple database nodes. In other words, the database 102 can include multiple database nodes (Node1 to Node N) where a database node (Node I) can access one or more resources 104 (e.g., processors, volatile memory, persistent memory, persistent storage, Input/output (I/O) operations, communication or networking capabilities, Operating System (OS)).

As a multi-node database, each one of the database nodes 1-N can operate and process data independently but in a coordinated manner, which may allow the database nodes to communicate with a central entity (e.g., a database managing component) and/or directly or indirectly with each other. A multi-node database system is described further below with reference to FIG. 1B in accordance with one embodiment of the invention.

However, referring back to FIG. 1A, generally, the database 102 or one or more database nodes of the database 102 can access one or more resources 104 in the computing environment 100 to perform one or more tasks and/or to process data. As known in the art, generally, a resource 104 can be a physical or virtual component and may be used to perform or to facilitate performing a task or a computing task (e.g., processing or manipulating data, reading or writing data, communicating data to an internal or external component). As such, a resource 104 may be a physical resource. For example, one or more internal physical components of the database 102, or one or more devices connected to the database 102 can be computing resource 104 in the computing environment 100. A resource 104 may also be a virtual resource. For example, various files, network connections and memory areas can be virtual resources 104 that may be available to the database 102. As such, a resource 104 can, for example, include resources or computing resources often used to perform computing tasks (e.g., one or more general purpose or specialized processors, memory, access to I/O operations to read and write data) as well as various other resources (e.g., hard disk space, Random Access Memory (RAM), cache memory, and virtual memory, network throughput, electrical power, external devices, external devices).

Generally, a database or database system 102 can be provided by or as a system or computing system with an associated level of capacity, including computing capacity which can be representative of its potential to perform tasks. By way of example, for a relatively simple Personal Computer (PC), the computing capacity of the PC can be closely related to the clock cycle of its processor or as more commonly known its processing power or speed (e.g., one (1) Giga Hertz (GHZ)). However, more accurately, the computing capacity of a computing system can be closely related to all of the resources available to the computing system, including but not limited to its processor(s), memory, ability to perform I/O functions, its networking capabilities, storage space). As such, the computing capacity of the database 102 can be closely related to virtually all of the resources 104 available to it in the computing environment 100. It should also be noted that capacity of the database 102 does not necessary reflect its actual or current level of usage. Rather, the capacity of the database 102 is generally related to a maximum level of usage that can be accommodated by the resources 104.

To further elaborate, consider when that database 102 is provided as a computing system. In that case, when the capacity of the computing system is at full capacity or one hundred (100) percent, the computing system can be operable up to its maximum potential capacity. This does not, however, mean that the computing system has to operate or ever reach its capacity or maximum potential. As such, a computing system may, for example, be operating at seventy five (75) percent capacity even though it is operable at full capacity or one hundred (100) percent capacity when it is determined to reduce its capacity from full capacity to one half (or 50 percent). However, in the example, when the capacity is reduced from full capacity to half or fifty (50) percent, the computing system can no longer operate at 75% percent of its full capacity (i.e., the level it was operating before its capacity was reduced from).

To further elaborate, FIG. 1A depicts the controlled capacity of the database 102 and the actual usage of the capacity (i.e., actual usage of resources 104 by the database system 102) over time. As such, the capacity of the database 102 can be a cap placed on the extent of usage of the resources 104. In other words, the capacity of the computing environment 100 and/or database 102 can be controlled by controlling the extent in which the resources 104 are made available in accordance with one aspect of the invention. Moreover, it will be appreciated that the capacity management system 101 can control the capacity of the database 102 so as to change or vary the capacity over time in a controlled manner in accordance with another aspect of the invention. This means that the capacity management system 101 can effectively change the capacity of the database system 102 from a first capacity (C1) at a time T1 to a second capacity (C2) at time T2, which is different than the first capacity (C1). In other words, the capacity of the database system can be changed or varied at runtime or execution time in a dynamic manner.

As depicted in FIG. 1A, the computing capacity of the computing environment 100 and/or database system 102 can be varied over time. Moreover, the capacity management system 101 can achieve this variation of the computing capacity in a controlled manner, where the current computing capacity may be increased or decreased as desired and/or needed. This means that the capacity of the database 102 and/or computing environment 100 can be controlled on demand to provide Capacity On-Demand, or Capacity on Demand (COD).

As will be described in greater detail, the capacity management system 101 can use various techniques in order to effectively change the capacity of the database 102. By way of example, the capacity management system 101 can be operable to change the effective processing speed (or maximum processing speed) of one or more processors provided as, or among, the resources 104. In addition, or alternatively, the capacity management system 101 can, for example, be operable to change the effective rate in which the processors operate (e.g., by skipping one or more clock cycles). As another example, access or execution time of one or more processors provided as or among the resources 104, as well as other various other resoures 104 (e.g., access to I/O operations) can be delayed. In addition, the time, rate and/or duration of access to a resource 104 can be controlled to effectively monitor and limit the extent of access to the resource 104. Techniques for changing the capacity of the database system 102 are discussed in greater detail below.

By in large, the computing capacity of a computing system, which may be more directly related to its ability (e.g., performing tasks, processing data) can be a good representative of its overall or general capacity. As such, rather than controlling all the resources 104 representative of a general capacity which may include resources less directly related to performing computing tasks (e.g., hard disk capacity, power resource, network capability), controlling the computing capacity by controlling the resources that are more directly related to performing tasks and processing data can be sufficient, especially for database systems that primarily function to process data and requests pertaining to data stored in a database. Accordingly, techniques for controlling the computing capacity of database system 102 are further discussed below in greater detail. The techniques are especially suited for computing systems that primarily function to perform computing tasks (e.g., database systems, computing systems that primarily function to process data and/or perform computing tasks).

As noted above, the database or database system 102 (depicted in FIG. 1A) can, for example, be a multi-node database system. Moreover, it will be appreciated that a capacity management system 101 can be provided to control the capacity of a multi-node database system 102. In fact, such a capacity management system can be provided as a part of a multi-node database system 102.

To further elaborate, FIG. 1B depicts a multi-node database system 120, including a computing capacity management system 121 in accordance with one embodiment of the invention. It will be appreciated that the computing capacity management system 121 can be operable to change the computing capacity of multiple database nodes (Nodes 1-N) of the database system 120 at execution time in a controlled and dynamic manner. This means that the computing capacity management system 121 can effectively control the computing capacity of the multi-node database system 120 by effectively controlling the computing capacity of one or more (or all) of the database nodes 1-N when data is being processed by one or more database nodes 1-N of the multi-node database system (e.g., when database queries are being processed). In other words, capacity management system 121 can effectively control the extent of access to resources 104 by one or more (or all) of the database nodes 1-N of the multi-node database system 120.

It should be noted that the computing capacity management system 121 can, for example, depict in greater detail components that can be provided for the capacity management system 101 shown in FIG. 1A. Specifically, the capacity management system 121 can include a central component 121A and a node component 121B in accordance with the embodiment depicted in FIG. 1B. The central component 121A of the computing capacity management system 121 can be operable to effectively control the computing capacity of the database system as whole and/or coordinate or manage the capacity control activities as performed locally at one or more database nodes 1 to Node N. In contrast, a node component 121B can primarily control and/or monitor the computing capacity of a particular database node (i.e., a node I) without controlling or having knowledge about the manner in which the capacity of any other database nodes, or the capacity of the multi-node database system 120 as a whole, is being controlled.

Generally, the computing capacity management system 121 of the multi-node database system 120 can be operable to obtain (e.g., receive, determine) an overall target capacity for the multi-node database system 120 and effectively set and/or change the computing capacity of the multi-node database system 120 to the overall target capacity. As described in greater detail below, the computing capacity management system 121 can also be operable to maintain the overall capacity for the multi-node database system 120 at an overall target or desired computing capacity. By way of example, the central component 121A may obtain an overall target capacity for the multi-node database system 120, and based on the overall target capacity, determine an individual target capacity for a particular database node. Accordingly, the central component 121A can, for example, be operable to communicate the determined individual target capacity of a particular database node (Node I) to its respective node component 121-BI. The node component 121-BI can, in turn, set and/or maintain the computing capacity of the database node I to the determined individual target capacity as communicated by the central component 121A. Other database nodes can operate in a similar manner to set and maintain their node capacity at a target capacity. As a result the overall target computing capacity for the database system can be achieved.

For example, a target overall computing capacity which is half (or 50 percent) of the full computing capacity can be received as input by the computing capacity management system 121 as a target computing capacity for the database 120. In the example, the central component 121A may determine to change the computing capacity of each one of the database nodes (Node 1-Node N) from their current capacity, which may be at full computing capacity to half computing capacity. As such, central component 121A may be operable to communicate with all of the node components (121B1-121-BN) to effectively cause them to change their capacities from full to half computing capacity.

Alternatively, central component 121A may determine to set the capacities of the individual database nodes (Node 1-Node N) to various levels individually to achieve the desired overall target capacity. As such, central component 121A may cause the capacity of a first database node to be changed from full to half capacity, while the computing capacity of a second database node may be increased from twenty five (25) percent to fifty (50) percent, the computing capacity of a third database node may be set to seventy (70) percent computing capacity, the computing capacity of a third database node may be set to thirty (30) percent computing, and so on, in order to achieve a desired overall capacity, namely, half or fifty (50) percent overall capacity for the multi-node database system 120.

As another example, if one or more database nodes of the multi-node database system 120 fail, the capacity of the database nodes that are still operable can be adjusted to compensate for the loss of one or more nodes in order to still achieve an overall capacity for a database. In the example, the capacity of the database nodes can be readjusted when all database nodes become operable again.

Figure 1C:
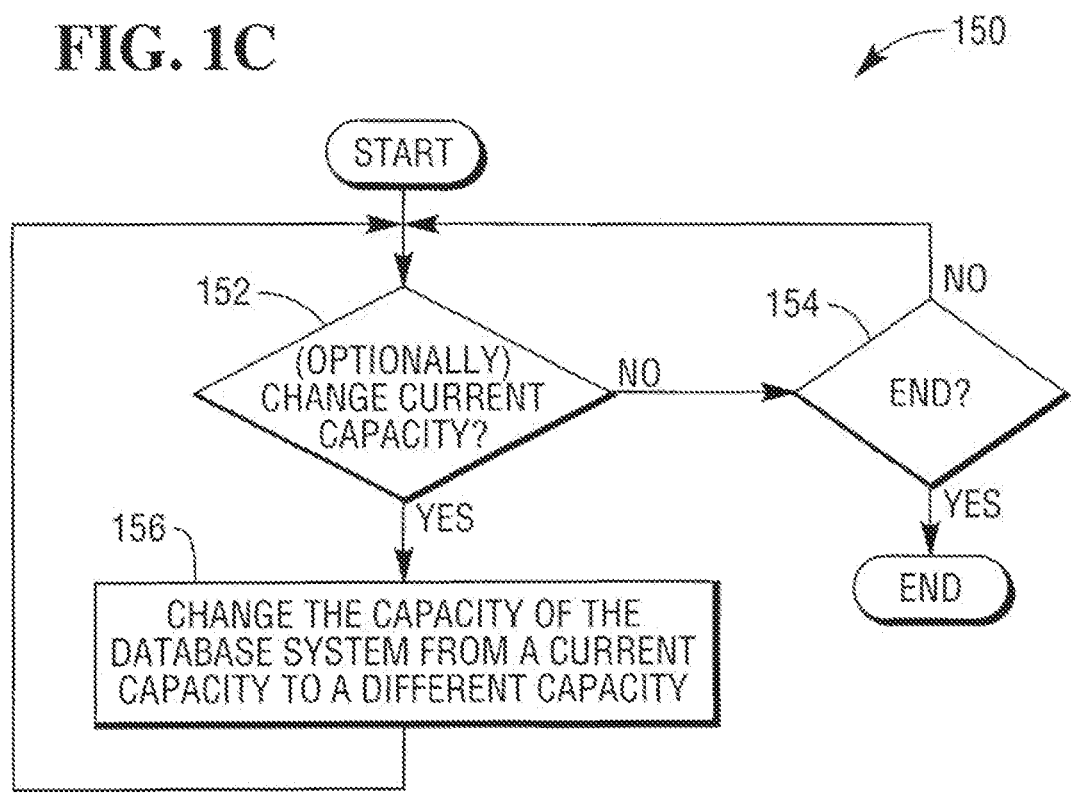
FIG. 1C depicts a method for controlling capacity of a database system in accordance with one embodiment of the invention.

To further elaborate, FIG. 1C depicts a method 150 for controlling capacity of a database system in accordance with one embodiment of the invention. Method 150 can, for example, be performed by the capacity management system 101 (shown in FIG. 1A) or the computing capacity management system 121 (shown in FIG. 1B).

Referring to FIG. 1C, optionally, it can be determined (152) whether to change the capacity of a database system from its current capacity. As those skilled in the art will readily appreciate, the determination (152) can, for example, represent a design or programming choice and/or can be made based on input and/or one or more criteria (e.g., determining a need to change the capacity to handle a high priority request or performing system upgrade, receiving a target capacity as input, receiving a command to change the capacity). In effect, method 150 can wait for a determination (152) to change the capacity of the database system unless it is determined (154) to end the method 150. As such, the method 150 can, for example, end as a result of receiving input, system shutdown, etc. However, if it is determined (152) to change the capacity of the database system, the capacity of the database system can be changed (156) from its current capacity to a different capacity. The capacity of the database system can, for example, be changed by causing the usage capacity of at least one of the resources to be changed from a current usage capacity to a different usage capacity. Thereafter, method 150 can proceed to determine whether to change the capacity of the database system in a similar manner as noted above. Method 500 can end if it is determined (154) to end it.

As noted above, a capacity management system (e.g., capacity management system 101 depicted in FIG. 1A, computing capacity management system 121 depicted in FIG. 1B) can be operable to change or vary the capacity of the database system at execution time or runtime, in a dynamic manner in accordance with aspect of the invention.

Figure 2:
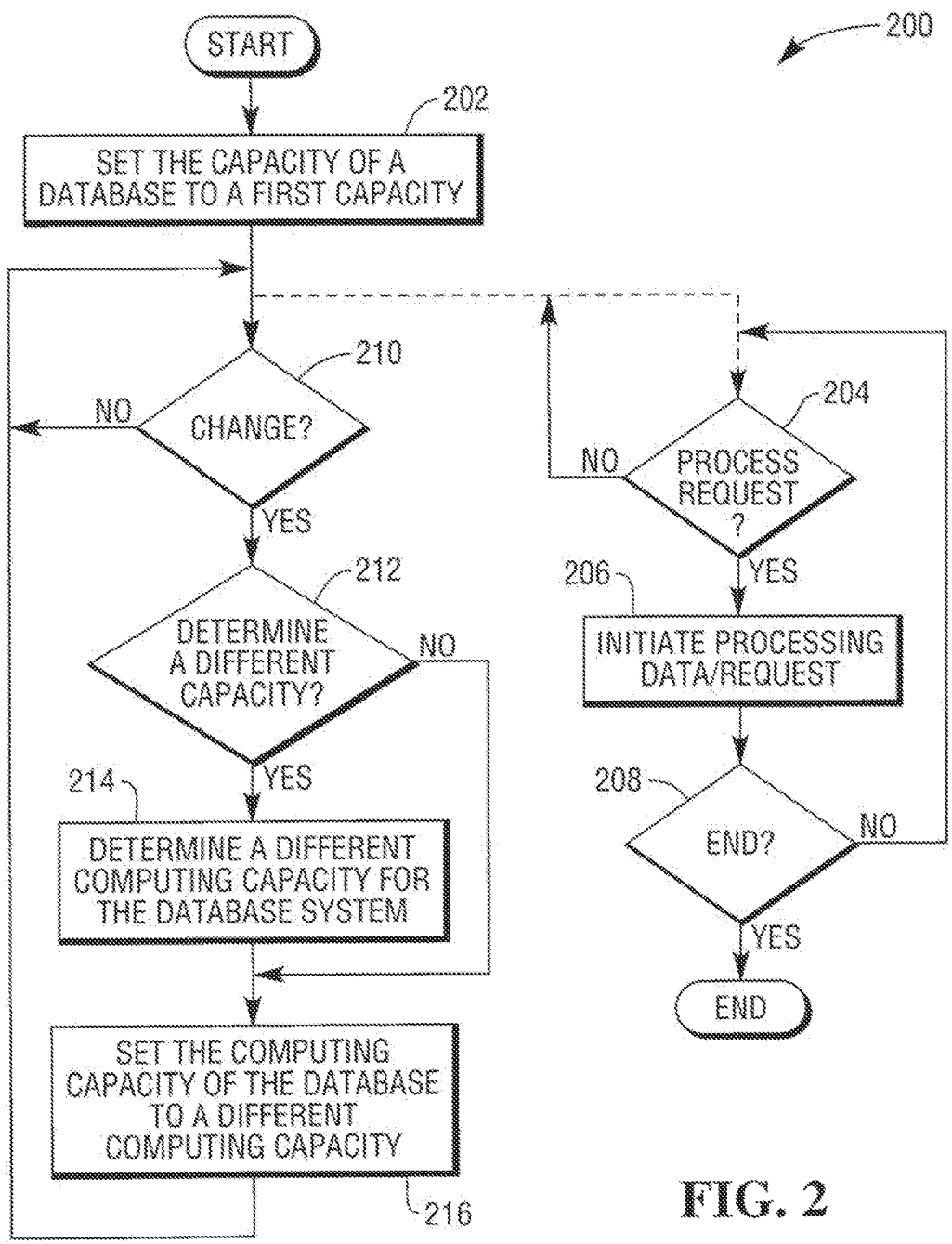
FIG. 2 depicts a method for processing data by a database (or database system) in accordance with one embodiment of the invention.

To further elaborate, FIG. 2 depicts a method 200 for processing data by a database (or database system) in accordance with one embodiment of the invention. Method 200 can, for example, be performed by the capacity management system 101 (shown in FIG. 1A) or the computing capacity management system 121 (shown in FIG. 1B).

Referring to FIG. 2, initially, the computing capacity of a database is set (202) to a first capacity (e.g., a first computing capacity). As noted above, the capacity of a database can, for example, be set to a particular value by setting (e.g., changing, adjusting, limiting) the usage capacity of one or more resources (e.g., processors, access to I/O operations) associated with the database. Next, the database can process data and various database operations can be performed. In other words, conventional database operations can be performed. Specifically, it can be determined (204) whether a database request or query has been received. Accordingly, processing of a database request can be initiated (206). In effect, method 200 can continue to process data and perform database operations unless it is determined (208) to end processing of the data and the performing database operations. The database operations can, for example, end as a result of a system shutdown or receiving authorized input. As such, the method 200 can end if it is determined (208) to end the processing of data and performing database operations.

However, it should be noted that while the data is being processed and/or database operations are being performed by the database, it can be determined (210) whether to change the capacity of the database. The determination (210) can, for example, be made based on input indicative of change, or based on one or more criteria (e.g., one or more system conditions, periodic adjustments, need to meet service goals). If it is determined (210) to change the capacity of the database, it can also be determined (212) whether to determine a capacity (i.e. different or new capacity) for the database.

It should be noted that a different capacity can be received as input so there may not be a need to determine (214) a capacity for the database. However, if it is determined (212) to determine a capacity for the database, a capacity which is different than the first capacity can be determined (214) for the database. It will be appreciated by those skilled in the art, a capacity for the database can be determined based on one or more criteria (e.g., the extent in which excess capacity is needed to perform maintenance, periodic adjustment, past usage and/or anticipated usage, amount of money paid for capacity).

In any case, if it determined (210) to change the capacity of the database from the first capacity to a different capacity, regardless of whether a capacity is determined (212) or not, the capacity of the database is set (214) to a second capacity, different than the first capacity (i.e., higher or lower than the first capacity). The capacity of the database can be set to the second capacity, for example, by affecting the usage capacity of one or more resources associated with the database (i.e., by effectively increasing or decreasing the usage capacity or extent of allowed usage of one or more resources associated with the database).

After, the capacity of the database has been effectively changed by setting (214) the capacity to a second capacity, the method 200 can proceed determine (210) whether to change the capacity of the database. As result, the capacity of the database can be changed (216) in a dynamic manner at runtime or execution time, while the data is being processed and database operations are being performed by the database (i.e., the database is operational and/or active) in a similar manner as discussed above. Method 200 ends if it determined (208) to the end the processing of data and database operations.

As noted above, it can be determined whether to change the current capacity of a database (or database system) based on input indicative of change, or one or more criteria (e.g., one or more system conditions, periodic adjustments, need to meet service goals). By way of example, it can be determined to extend or increase the current capacity of a database in order to meet a system requirement (e.g., a Service Level Agreement (SLA) requiring high priority database queries to be processed within a determined time period, system maintenance or update). As such, it can, for example, be determined to allow excess capacity beyond a target capacity (e.g., fifty (50) percent) in order to meet an SLA or to allow a system update. It should also be noted that excess system capacity can also be measured and accounted (e.g., billed) in accordance with one aspect of the invention.

Figure 3:
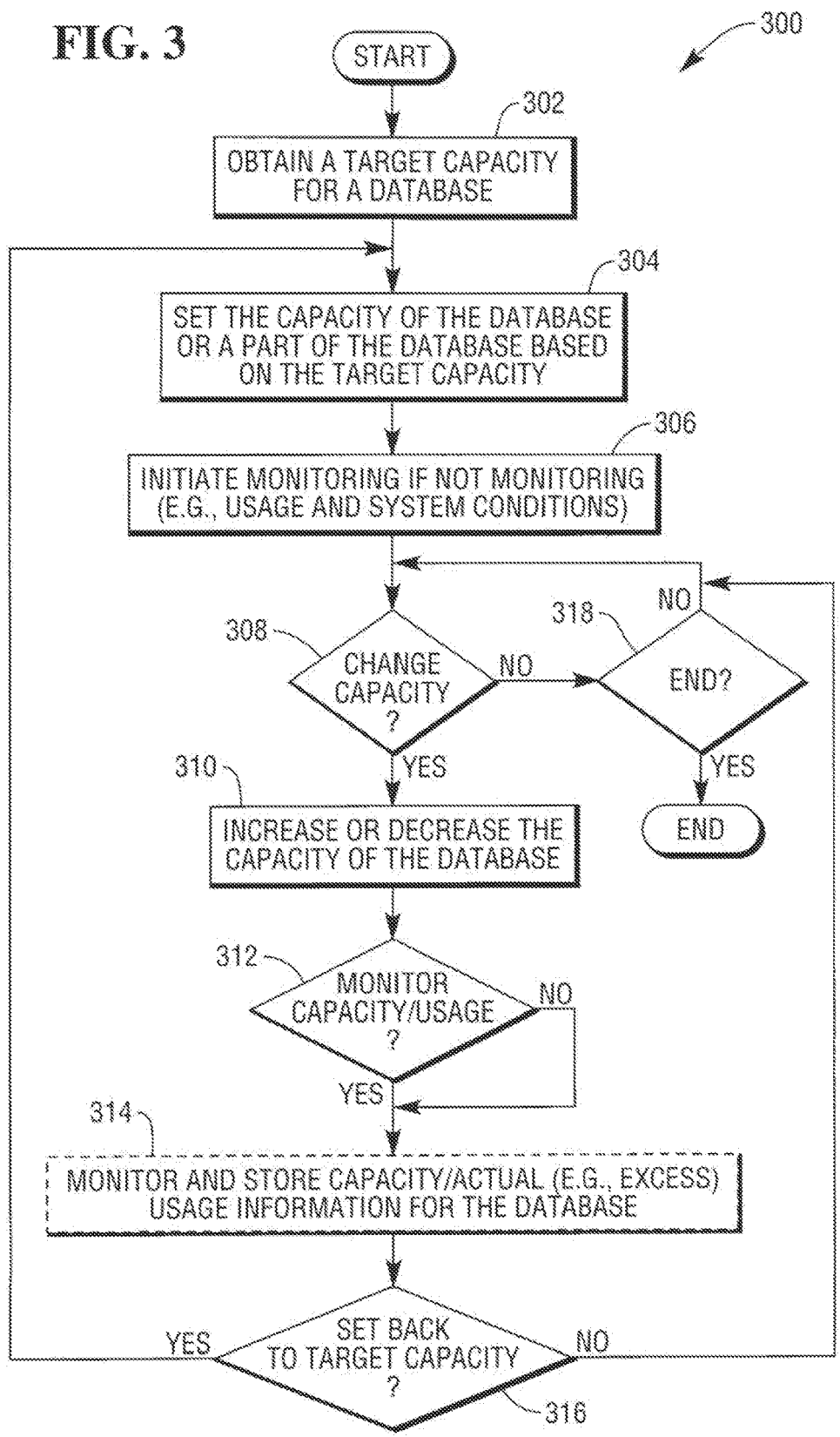
FIG. 3 depicts a method for controlling the capacity of a database (or a database system) in accordance with another embodiment of the invention.

To further elaborate, FIG. 3 depicts a method 300 for controlling the capacity of a database (or a database system) in accordance with another embodiment of the invention. Method 300 can, for example, be performed by the capacity management system 101 (shown in FIG. 1A) or the computing capacity management system 121 (shown in FIG. 1B).

Referring to FIG. 3, initially, a target capacity for the database can be obtained (302). The target capacity can, for example, be received as input or determined based on one or more criteria (e.g., capacity selected and/or paid for by a user and/or customer of a database, types and/or number of database requests currently pending). It should be noted that the target database capacity can, for example, be representative of an overall target capacity for a database or a database system (e.g., a multi-node database system), or a specific target capacity for one or more database nodes of a multimode database). After the target capacity of the database is obtained (302), the capacity of the database or a portion of the database (e.g., one or more database nodes of a multimode database) can be set (304) to the target system capacity.

As will be described in greater details below, the capacity of at least a part of the database can be set (304) based on a target capacity by using one or a combination of various techniques. By way of example, one or more database tasks or activities can be regulated with respect to the access to one or more resources of the database based on the target capacity. In other words, the extent to which one or more database tasks or activities can access one or more resources of the database (e.g., access to processor for execution time, access to I/O operations) can be controlled based on a target capacity in order to effectively set the capacity of at least a portion of the database to the target capacity. As another example, the effective processing rate and/or clock rate of one or more processors of the database can be set based on the target capacity.

In any case, in addition to setting the capacity of at least a portion of the database based on the target capacity, monitoring can be initiated (306) if it has not been initiated already. This monitoring can, for example, include monitoring the usage of one or more resources and/or one or more system conditions (e.g., monitoring execution of one or more database tasks and resources consumed by them, monitoring for conditions that are programmed to trigger change in the capacity of the database).

After the monitoring has been initiated (306) it is determined (308) whether to change the capacity of at least a portion of the database from its current capacity (e.g., whether to change the capacity of a database from a target capacity under which the database is configured to operate under normal circumstances). It should be noted that the determination (308) can be made based on the monitoring data obtained as a result of the monitoring that has been initiated (306) and after at least a portion of the database has been set (304) or configured to operate at a target capacity. By way of example, monitoring (306) of one or more system conditions can indicate a need to increase the capacity. As such, it can be determined (308) to allow the database to exceed its target capacity at least for a period of time. Generally, if it is determined (308) to change the capacity of at least a portion of the database, the capacity of at least one portion of the database can be increased or decreased (310). By way of example, the overall capacity of a multi-node database system can be increased from its target capacity, fifty (50) percent, to seventy five (75) percent in order to meet a need or a requirement.

It should be noted that capacity and/or actual usage can optionally be monitored and stored (e.g., measured and recorded) based on the monitoring (306) of the tasks and the resources consumed by them. As such, it can optionally be determined (312) whether to monitor (e.g., measure) the capacity and/or actual usage of the capacity provided. Consequently, the capacity and/or actual usage of the capacity of a database can be monitored and stored (314). By way of example, capacity used beyond a target capacity (or excess capacity) can be measured based on monitoring the usage of one or more resources consumed by database tasks or activities. Usage of resources in an excess of the target capacity can, for example, be billed at a cost or as an additional cost beyond the target capacity. After the capacity of at least a portion of database has changed (312) it can be determined (316) whether to set the capacity of at least a portion of the database back to the target capacity. Accordingly, the capacity of at least a portion of the database can be set (304) to the target capacity again and the method 300 can proceed in a similar manner as discussed above.

However, if it is determined (316) not to set the capacity of at least a portion of the database to the target capacity, the method 300 can proceed to determine whether to change the capacity of at least a portion of the database. In effect, method 300 can wait for a determination (308) to change the capacity of at least a portion of the database unless it is determined (318) to end the method 300, for example, based on input provided by a database administrator, or when the system is to be shut down.

Controlling Processing Capacity of Computing Environment that May Include a Database It will be appreciated that fine-grained control over the processing capacity of computing environments, including those that provide a database, can be exercised in accordance with one aspect of the invention.

Figure 4A:
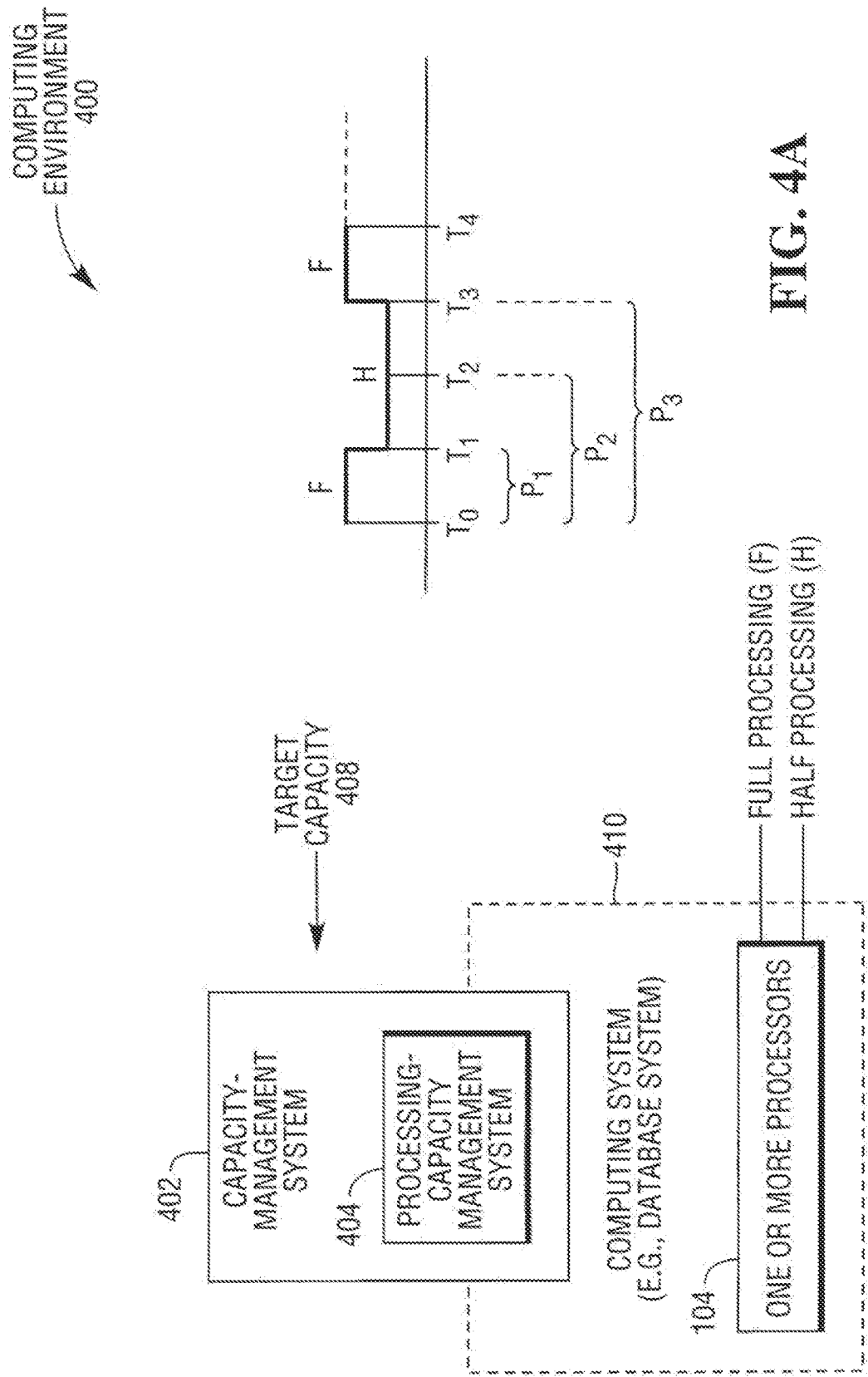
FIG. 4A depicts a computing environment with a capacity-management system in accordance with one embodiment of the invention.

To further elaborate, FIG. 4A depicts a computing environment 400 with a capacity-management system 402 in accordance with one embodiment of the invention. Referring to FIG. 4A, the capacity-management system 402 includes a processing-capacity management system 404 operable to manage the processing capacity of the computing environment 400. More specifically, the processing-capacity management system 404 can effectively control the processing capacities (e.g., processing rates) of the one or more processors 104 based on a target (or desired) capacity 408. It should be noted that the target capacity 408 need not necessarily be a target processing capacity or necessary specifically refer to a processing capacity to be achieved for the one or more processors 104. As such, the target capacity 408 can, for example, be a general target capacity of a computing system 410 that includes the processor(s) 104 (e.g., overall target capacity including processing, I/O, etc.). Of course, the target capacity 408 can also be a specific processing capacity received as input (e.g., 2.25 MHZ, 13% of the maximum processing rate) for the processor(s) 104. As another example, a specific processing capacity can be determined or derived based on a general target capacity 408 (e.g., 13% of the system capacity, one eighteenth (1/18) of the maximum overall processing capacity).

It should be noted that the processing capacities of the one or more processors 104 can be and/or include one or more processing rates for the one or more processors 104 as will be appreciated by those skilled in the art. Those skilled in the art will also appreciate that a processing rate for a processor 104 can be an actual processing rate (e.g., an actual clock rate) or an effective processing rate (e.g., a lower effective processing rate of an actual clock rate provided, for example, by causing one or more actual clock cycles to be idle. Other ways to affect the processing rate of a processor, for example, include changing the power supply provided to the processor which could increase or decrease the processing rate. As is generally known in the art, the performance of a processor (e.g., a CPU) can be reduced by slowing its clock cycle or turning off one or more hardware components (e.g., cores, functional units). Also, reducing voltage of the processor can require slowing the clock. Reducing power limits of processor can require slowing the clock and/or turning off one or more of its hardware components. Generally, the processing capacity of a processor can be directly affected by using one or more of these techniques (e.g., reduce the clock cycle, turn off a hardware component). In the following discussion, the term processing rate is also used for ease of discussion with reference to changing clock cycles but use of this term does not limit changing clock cycles as the only approach to changing the processing capacity which may be available since the techniques of the invention are not dependent on the specific technique used to directly change the actual or effective processing rates of a processor.

As suggested by FIG. 4A, it should also be noted that the capacity-management system 402 can, for example, be part of a computing system (e.g., a database system) 410 that includes the processor(s) 104. In any case, as a part of the capacity-management system 402, the processing-capacity management system 404 can effectively manage the processing capacity of at least one processor 104 based on a target (or desired) capacity 408 that can, for example, be received as input. The processing capacity is at least a part of the overall capacity of the computing environment 400. As such, the processing-capacity management system 404 allows managing the overall capacity of the computing environment 400 based on a target capacity 408 that can be received as input. In other words, as a component of the capacity-management system 402, the processing-capacity management system 404 can effectively manage and/or control the processing capacities of the one or more processors 104 based on the target capacity 108.

In doing so, the processing-capacity management system 404 can affect the processing-capacities of the one or more processors 104. In other words, the processing-capacity management system 404 can change the processing capacity of a processor 104 based on the target capacity 108. This means that the processing-capacity management system 404 can cause a processor 104 to operate with different processing capacities, including, for example, multiple actual processing rates that may be readily available and/or configured for a processor 104 (e.g., 1/8, 2/8, 3/8 . . . 8/8 effective clock cycles available on a processer based on a software command). Moreover, processing rates and/or effective processing rates can be achieved that are not configured or not readily available for a process 104.

By way of example, a processor 104 can be a processor configured to operate at a number of different actual clock rates (e.g., at a maximum rate of 8/8 clock cycles, at half of the maximum clock rate of 4/8 clock cycles) based on an instruction or command that can be issued to the processor 104. As another example, processing-capacity management system 404 can effectively cause one or more clock cycles of a processor 104 to be idle where no processing is performed (e.g., every other clock cycle can be effectively skipped, for example, by a "wait" instruction causing a delay of one or more clock cycles to achieve and effective clock rate lower than the actual clock rate). As a result, the processing-capacity management system 404 can achieve various effective clock rates for a processor 104 even though the processor 104 may not be configured to operate at multiple actual clock rates.

It should be noted that unlike conventional systems, processing-capacity management system 404 can effectively control the processing capacity of the computing environment 400 based on the target capacity 408 so that, for example, a target capacity lower than the full capacity can be achieved despite any demand, input or need for processing at full or maximum capacity. As such, capacities that are lower than the full capacity can be achieved and maintained regardless of any explicit or implicit requests for higher processing capacities from the system by users (e.g., a database system can operate at a lower processing capacity despite the amount of work (or workloads) that may be initiated by database users). In other words, the processing capacity of the computing environment 400 can be controlled by the processing-capacity management system 404 without requiring user input in an automatic manner.

In addition, the processing-capacity management system 404 can effectively control the processing capacities of the one or more processor 104 so that the processing capacities is not directly affected based on the amount of work requested by the users of the computing environment 400 and/or computing system 410. In other words, the users cannot directly circumvent the control of the processing capacity exercised by the processing-capacity management system 404.

In view of the foregoing, it will be apparent that the target capacity 408 can be adjusted dynamically for a database system while the database is active, operational and/or at runtime when at least a part of the database system is being executed as a software component. Furthermore, it will be appreciated that target capacity 408 and/or a processing capacity associated with it can be adjusted (e.g., dynamically, statically) for example, by a value (e.g., an incremental value, one percent (1%) more than what is currently provided, increase by two percent (2%) more every other month for two (2) years until ninety percent (90%) is reached, 0.2356 of maximum capacity) based on an agreement (e.g., an agreed upon measurement by the both a customer and a vendor of a database system). Also, the capacity, including processing capacity, provided by and/or for a database system can be measured. The measured capacity can, for example, be billed to a customer of a database system pursuant to an agreement between the customer and a vendor of the database system.

To further elaborate, FIG. 4A depicts a very simple example where a processor 104 can operate or can be operated at two different processing capacities, namely Full (F) and Half (H) processing capacities. A Full (F) processing capacity can, for example, represent a maximum configured clock rate (e.g., 3.2 GHZ) as will readily be understood by those skilled in the art. On the other hand, a Half (H) processing capacity can, for example, represent a clock rate for a processor configured to operate at half of its maximum clock rate (e.g., 1.6 GHZ). As such, in this example, a processor 104 could operate at two (2) different clock rates, namely full and half clock rates (e.g., 3.2 GHZ and 1.6 GHZ) based on input (e.g., control signals) that can directly or indirectly be provided by the processing-capacity management system 404. As another example, a Half (H) processing capacity can, for example, be caused or induced by skipping a clock cycle. This skipping operation can, for example, be done by the processing-capacity management system 404 and/or another component (not shown) that may be directed by the processing-capacity management system 404 and/or be in a communication with the processing-capacity management system 404.

In any case, the processing-capacity management system 404 can effectively control whether a processors 104 is to operate at Full (F) or a Half (H) processing capacity based on the target capacity 408. By way of example, if target capacity 408 is provided as a processing capacity of seventy five percent (75%) of the maximum processing capacity and a processor 104 is currently operating at Full (F) processing capacity, the processing-capacity management system 404 can change the processing capacity of the processor 104 to the Half (H) processing capacity and cause the processor 104 to operate at the Half (H) processing capacity for a period of time before the processing capacity is switched back to the Full (F) processing capacity. Generally, the processing-capacity management system 404 can determine whether to change the processing capacity of a processor 104. This determination can, for example, be made based on a measured processing capacity of the processor 104 over a period of time (e.g., a measured average processing capacity taken over a determined amount of time).

As such, in this example shown in FIG. 4A, between time $t_o$ (when, for example, the computing system 410 may be started) and a time $t_1$ when the target capacity 408 can, for example, received as input for the target capacity of the computing system 410, the processing capacity may be at Full (F) capacity. Hence, a measured processing capacity that can, for example, be taken in a first period P1 ($t_o$-$t_1$) can yield a measured processing capacity equal to Full (F) processing capacity, or one hundred percent (100%). However, the target capacity 408 can be indicative of a lower processing capacity than the processing capacity measured over the first time period (100% over P1). As such, for example, a target capacity 408 of seventy five percent (75%) can be received at time $t_1$. As a result, the processing-capacity management 404 can change the processing capacity from Full (F) to Half (H) processing capacity or about time $t_1$. Then, at time $t_2$, the measured processing capacity taken over a second time period (P2), from time $t_1$ to $t_2$, would be about seventy five percent (%75 percent) (75=(100+50)/2) which is the desired target capacity 108 in this example. As such, at time $t_2$, the processing-capacity management 404 may allow the processor 104 to continue to operate at the H processing capacity or switch to the F processing capacity. Assuming that the processor 104 is allowed to continue to operate at H capacity between $t_2$ to $t_3$, the next measured processing capacity taken over a third period of time (P3) between $t_o$-$t_3$ would be about sixty seven percent (66.66%) ((100+50+50)/3) that is significantly lower than the target processing capacity of seventy five percent (%75) in this example. As a result, at or about $t_3$ the processing-capacity management 404 can change the processing capacity of the one or more processors 104 from the H back to the F processing capacity, and so on, to effectively achieve and maintain the target processing capacity of seventy five percent (%75) over an extended period of time ($t_o$-$t_n$).

Generally, the processing-capacity management system 404 can determine to switch back and forth between multiple processing capacities to effectively cause the processors 104 to operate at a target capacity 408 over a period of time. It should be noted that the target capacity 408 may not be configured for and/or readily available for the processors 104. Nevertheless, the processing-capacity management system 404 can effectively achieve target processing capacities (e.g., clock rates) that may be between two configured processing capacities. By way of example, even if the processors 104 can be operated at only two (2) different processing rates, namely, at one hundred percent (100%) at Full (F) processing capacity and at fifty percent (50%) at Half (F) processing capacity, virtually any processing capacity, including a processing between fifty percent (50%) to one hundred percent (100%) can be achieved by the processing-capacity management system 404. For example, it is possible to achieve, target processing capacities of seventy eight percent (78%), 78.1%, 78.67%, and so on. In the example above, it is also possible to achieve virtually any target processing capacities between zero (0) to fifty percent (50%) by effectively causing the processor(s) 104 to switch between fifty percent (50%) processing capacity and being virtually idle (e.g., zero processing capacity) for determined period of times.

It is important note that the time periods when a processer 104 operates at a designated processing capacity need not be equal. In fact, it may be beneficial to allow a processer 104 to operate at one processing capacity (e.g., F processing capacity) for a longer period of time when the target capacity 108 (e.g., a ninety percent (90%)) target capacity in the example noted above) is much closer to one of the processing capacity (e.g., F processing capacity). The processing capacity of a processor can be measured at regular or irregular intervals, for example, as an average or a rolling average taken over time.

Figure 4B:
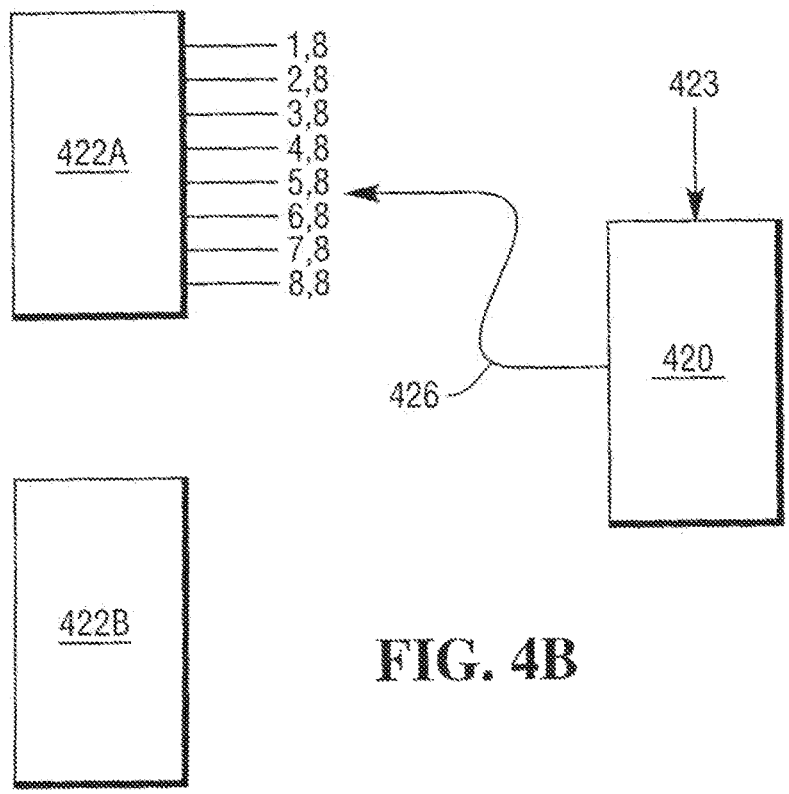
FIG. 4B depicts a processing-capacity management in accordance with another embodiment of the invention.

To further elaborate FIG. 4B depicts a processing-capacity management 420 in accordance with another embodiment of the invention. Referring to FIG. 4B, the processing-capacity management 420 can effectively control the processing rates of multiple processors 422 (422A and 422B) based on a target processing rate 423. Of course, the processing-capacity management 420 can effectively operate the processors 422A at 422B at different processing rates from each other but for ease of discussion, only controlling one of the processors, namely, the 422A will be discussed.

A processor 422A can, for example, be a processor configured to effectively operate at one eighth (1/8) intervals clock rates (1/8, 2/8, 3/8, 4/8, 5/8, 6/8, 7/8, and 8/8) of its maximum or full processing rate (8/8). As such, the clock rate of the processors can, for example, be controlled based on a control signal or hardware signal 426 which may be readily available and effectively provided to the processor 422A by the processing-capacity management 420.

Moreover, the processing-capacity management 420 can effectively achieve virtually any target processing rate for the processor 422A, including processing rates between two clock rates (e.g., clock rate between 2/8 (0.25) and 3/8 (0.375) of the maximum clock rate). By way of example, a clock rate of 0.28 of the maximum rate can be achieved by switching between the 2/8 (0.25) and 3/8 (0.375) of the maximum clock rate. In doing so, the processor 422A is operated at one of the clock rates for a designated period of time and then based on a measured average clock rate, the processing-capacity management 420 causes the processor 422A to operate at the second clock rate. By way of example, the processor 422A may be initially operating at 2/8 (0.25) of its maximum clock rate when a target clock rate of 0.28 is to be realized. As a result, the processing-capacity management 420 can cause the processor 422A to switch to the next available clock rate, namely, 3/8 (0.375) of the maximum clock rate. Thereafter, the average processing rate of the processor 422A over a period that includes the time it was operated at the 3/8 (0.375) of the maximum clock rate can be measured. This average can, for example, be calculated every second or fraction of a second, at every minute, based on balancing the desire for more accuracy and/or need to eliminate additional costs associated with calculating the average processing rate. Also, as noted above, it is not required that the average measurement of the clock rates be taken at equal intervals but it may simplify the implementation of the underling techniques to do so.

Based on the foregoing, it is also apparent various combination of the processing capacities, including clock rates of the processors 422A and 422B can be used to achieve an overall target clock rate with the processors possibly running at different clock rates at a given point in time or over an extended time (e.g., one processor operating at 23 percent target capacity while the other processor is running at 77 target capacity to yield half target capacity).

Figure 4C:
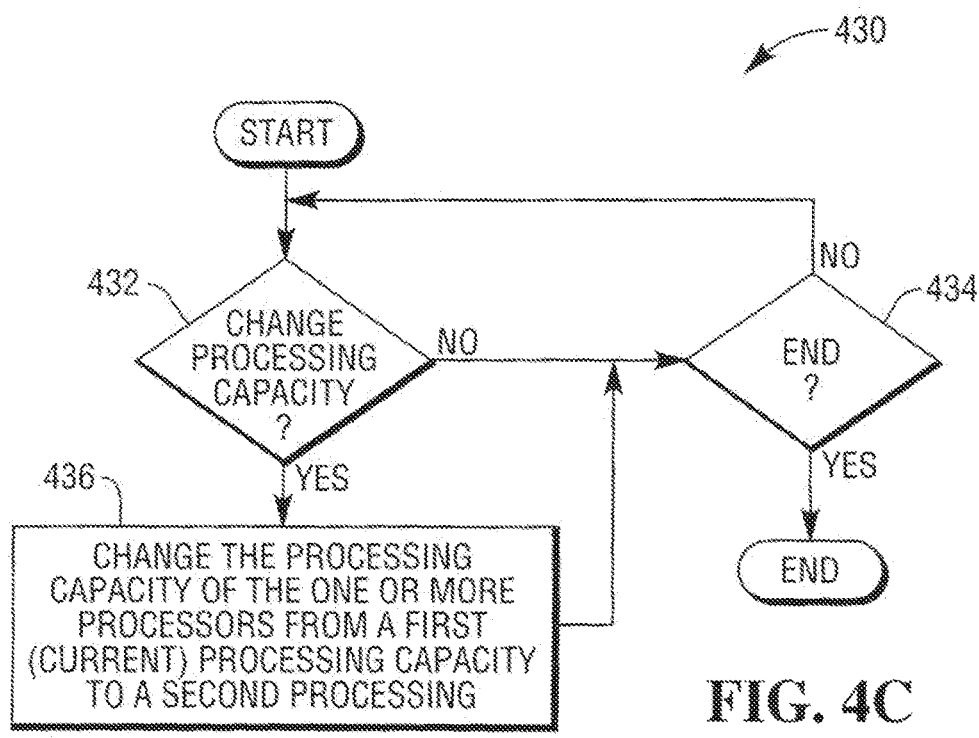
FIG. 4C depicts a capacity management method 430 for managing the capacity of computing environment in accordance with one embodiment of the invention.

To elaborate even further, FIG. 4C depicts a capacity management method 430 for managing the capacity of computing environment in accordance with one embodiment of the invention. The capacity management method 430 can, for example, be performed by the processing-capacity management system 404 depicted in FIG. 4A. As such, the processing-capacity management system can, for example, be used to manage the capacity of a computing system (e.g., a database system) in the computing environment. One or processors are operable in the computing environment which, for example, can be part of a computing system (e.g., a database system).

Referring to FIG. 4C, initially, it is determined (432) whether to change the processing capacity (e.g., processing rate) of at least one processor that is operable in the computing environment. In effect, the capacity management method 430 can wait for a determination to change the processing capacity of at least one processor in the computing environment unless it is determined (434) to end the capacity management method 430, for example, as a result of a system shutdown.

However, if it is determined (432) to change the processing capacity (e.g., processing rate) of at least one processor in the computing environment, the processing capacity of one or more processors can be changed (436) from a first (or current) processing capacity to a second (or different) processing capacity. Thereafter, the capacity management method 430 can proceed in a similar manner as noted above to determine whether to change the processing capacity (e.g., processing rate) of at least one processor that is operable in the computing environment. In effect, the capacity management method 430 can continue to operate and can change (436) the capacities of one or more processors in the computing environment if it determined (432) to do so until is determined (434) to end the capacity management method 430.

Figure 4D:
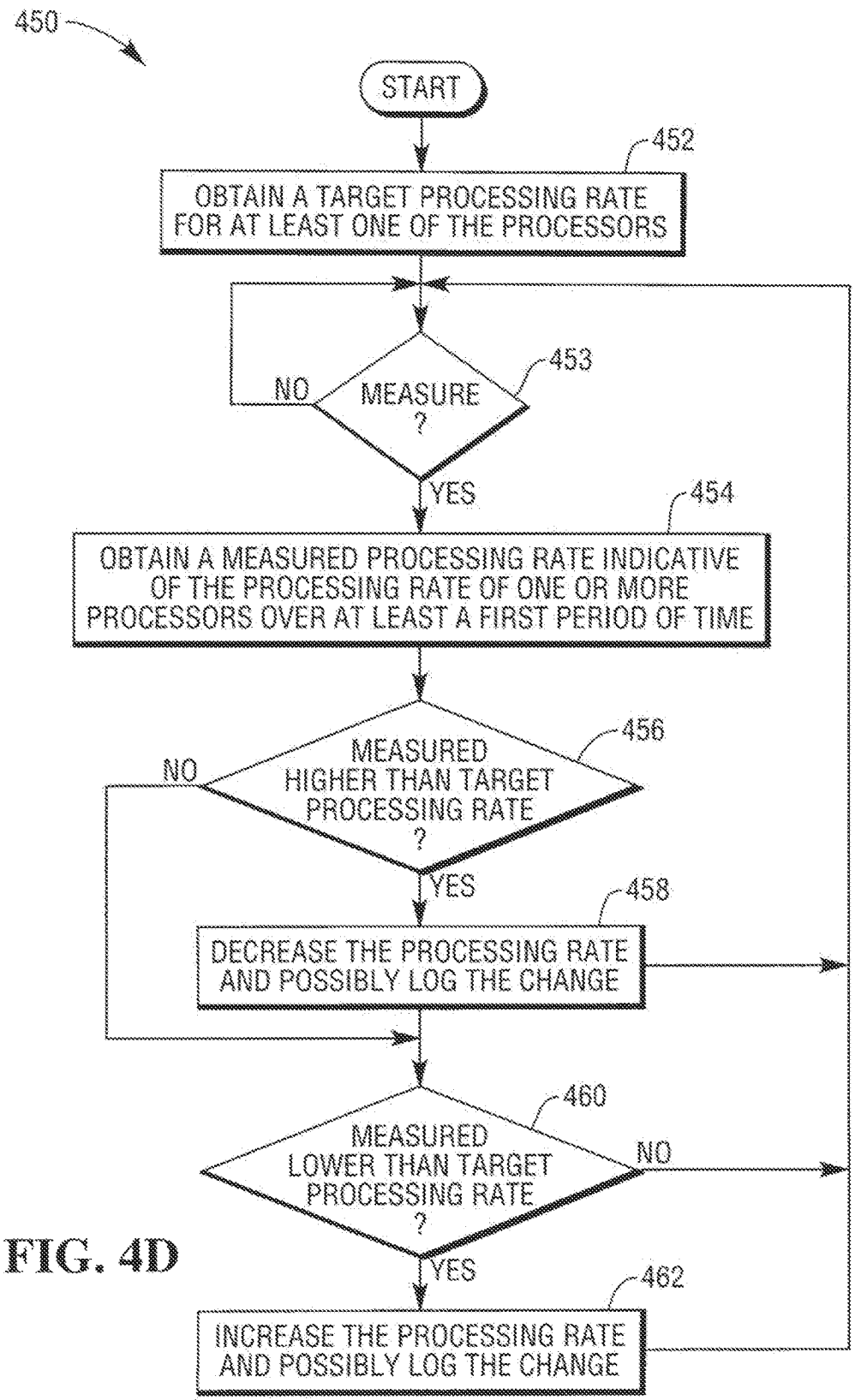
FIG. 4D depicts a processing-capacity controlling method for controlling the processing capacity of at least one processor in accordance with one embodiment of the invention.

To elaborate further still, FIG. 4D depicts a processing-capacity controlling method 450 for controlling the processing capacity of at least one processor in accordance with one embodiment of the invention. Operations shown in the processing-capacity controlling method 450 can, for example, represent one or more operations that can be performed by the changing (436) of the processing capacity shown in FIG. 4C.

Referring to FIG. 4D, initially, a target processing rate is obtained (e.g., received as input, determined based on one or more criteria or from a target capacity, selected from a number of selectable options). Next, it is determined (453) whether to obtain a current measured processing rate. A measured processing rate can be indicative of a processing rate of at least one processor over a period of a time (e.g., an average processing rate taken over a period of time). The measured processing rate can, for example, be determined (e.g., calculated) or it can simply be received as input from another component that takes or keeps track of the processing rates of the processor.

In any case, if it determined (453) to obtain a current measured processing rate, a current measured processing rate can be obtained (454). The determination (453) of whether to obtain a current measurement and/or taking the measurements itself can, for example, be performed based on a timer (e.g., at predetermined, or dynamically determined intervals). After both the target and measured processing rates have been obtained (452 and 454) it can be determined (456) whether the measured processing rate is higher than the target processing rate. Consequently, the processing rate of the processor can be decreased (458) if it is determined (456) that the measured processing rate is higher than the target processing rate. By way of example, the processing rate may be decreased to available processing rate which immediately precedes the current processing rate (e.g., changed from 3/8 to 2/8 of the maximum processing rate for a processors that is configured to operate at 1/8 intervals of its maximum processing rate). It should be noted that the change to the processing rate and the time the change occurs can be optionally logged or tracked, at least partly to allow calculation of the measured processing rate. The change in processing rates can also be used for other applications (e.g., power consumption calculations, billing). Of course, an external component can log the changes so it is not required for the method 450 to log the change and keep track of the processing rates.

On the other hand, if it is determined (456) that the measured processing rate is not higher than the target processing rate, it can be determined (460) whether the measured processing rate is lower than the target rate. Consequently, the processing rate can be increased (462) and the change can be optionally logged. In effect, no change to the processing rates is made so long as the measured processing rate is the same as the target processing rate but the method 450 can continue to increase and decrease the processing rate of at least one processor in the computing environment based on measured processing capacities (e.g., on a basis of rolling averages) to effectively achieve and maintain a desired target rate over a period of time.

Closed-Loop Capacity Management Architecture

It should be noted that a "closed-loop" capacity management architecture can be provided that utilizes at least in part the techniques described above with respect to achieving fine-grained control over the processing rate based on measured processing rates taken over a period of time. A "closed-loop" capacity management architecture can, for example, be similar to the closed-loop workload management architecture described in U.S. Pat. No. 7,657,501, entitled: "Regulating the Work Load of a Database System," by "Brown et al." and filed on Aug. 10, 2004, which is hereby incorporated by reference herein in its entirety and for all purposes. As described in greater detail in the U.S. Pat. No. 7,657,501, entitled: "Regulating the Work Load of a Database System," a system provided in "closed-loop" workload management architecture can satisfying a set of workload-specific goals. It will be appreciated that techniques described above with respect to exercising fine-grained control over the processing capacity of a database system based on measured processing capacities can also be used within a "closed-loop" capacity management, whereby instead causing a delaying in processing of data, the processing rates can be adjusted to manage the capacity of a database accordingly. However, For the sake of completeness, techniques for causing an effective delay are also described here. These techniques can be combined with the techniques described above with respect to exercising fine-grained control over the processing capacity of a database system based on measured processing capacities.

With respect to managing capacity, a system that can satisfy capacity goals or requirements in a "closed-loop" capacity management architecture will be described below. It should be noted that workload management and capacity management can be provided together in a system to allow meeting workload and capacity goals and requirements in accordance with another aspect of the invention. Since it may be more instructive to discuss a "closed-loop" system that can manage both workload and capacity of a database, a "closed-loop" capacity and workload management system is discussed below for the sake of comprehensiveness. However, as will be readily understood by those skilled in the art, it is not necessary to manage both capacity and workload of the database as each of these features can be provided separately even though it may be desirable to provide both of these features for some applications. Also, as noted above, processing rates can be effectively directly and/or a delay in processing with directly changing the processing rates can be used to manage processing capacity of a database.

As noted in the U.S. Pat. No. 7,657,501, entitled: "Regulating the Work Load of a Database System," an automated goal-oriented workload management system can support complex workloads and can self-adjust to various types of workloads. Major operational phases can include: 1) assigning a set of incoming request characteristics to workload groups, assigning the workload groups to priority classes, and assigning goals (called Service Level Goals or SLGs) to the workload groups; 2) monitoring the execution of the workload groups against their goals; 3) regulating (adjusting and managing) the workload flow and priorities to achieve the SLGs; 4) recommending adjustments to workload definitions (e.g. by splitting or merging workload definitions) in order to better isolate the subset of the workload that requires different workload management than the remainder of the original workload; and 5) correlating the results of the workload and taking action to improve performance.

The performance improvement can be accomplished in several ways: 1) through performance tuning recommendations such as the creation or change in index definitions or other supplements to table data, or to recollect Statistics, or other performance tuning actions, 2) through capacity planning recommendations, for example increasing system power, 3) through utilization of results to enable optimizer adaptive feedback, and 4) through recommending adjustments to SLGs of one workload to better complement the SLGs of another workload that it might be impacting. Recommendations can either be enacted automatically, or after "consultation" with the database administrator ("DBA").

Figure 5:
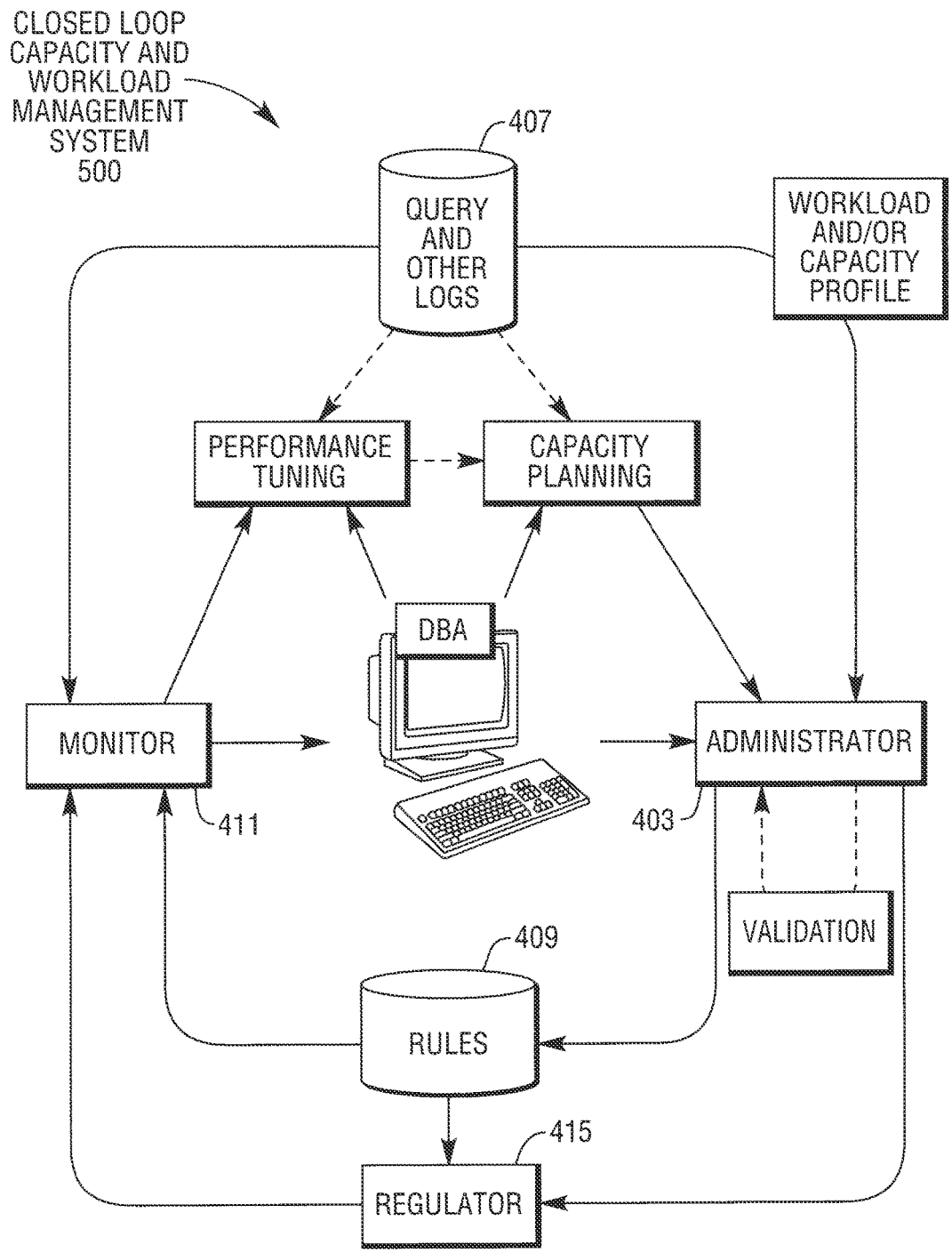
FIG. 5 depicts a "closed-loop" capacity and workload management system 500 in accordance with one embodiment of the invention.

FIG. 5 depicts a "closed-loop" capacity and workload management system 500 in accordance with one embodiment of the invention. Referring to FIG. 5, an administrator 403 can provide a GUI for defining rules 409 that can, for example, include capacity management rules, as well as workloads and their SLGs, and other workload or capacity management requirements. The administrator 403 accesses data in logs 407, including a query log and receives input including capacity and performance related inputs. The administrator 403 can be a primary interface for the DBA. The administrator can also establish rules 409, including capacity and workload rules, which can be accessed and used by other components of the closed-loop capacity management and workload management system 500.

A monitor 411 can effectively provide a top level dashboard view and the ability to drill down to various details of overall and individualized component capacity at various times, as well as workload group performance such as aggregate execution time, execution time by request, aggregate resource consumption, resource consumption by request, etc. Such data is stored in the query log and other logs 407 available to the monitor 411. The monitor 411 also includes processes that initiate the performance improvement mechanisms listed above and processes that provide long term trend reporting, which may include providing performance improvement recommendations. Some of the monitor 411 functionality may be performed by a regulator 415 which can monitor 411 capacity and workloads, for example, by using internal messaging system. The regulator 415 can dynamically adjust system settings including capacity and/or projects performance issues and can either alert the database administrator (DBA) or user to take action, for example, by communication through the monitor 411, which is capable of providing alerts, or through the exception log, providing a way for applications and their users to become aware of, and take action on, actions taken by the regulator 415. Alternatively, the regulator 415 can automatically take action by deferring requests or executing requests with the appropriate priority to yield the best solution given requirements defined by the administrator 403.

Figure 6:
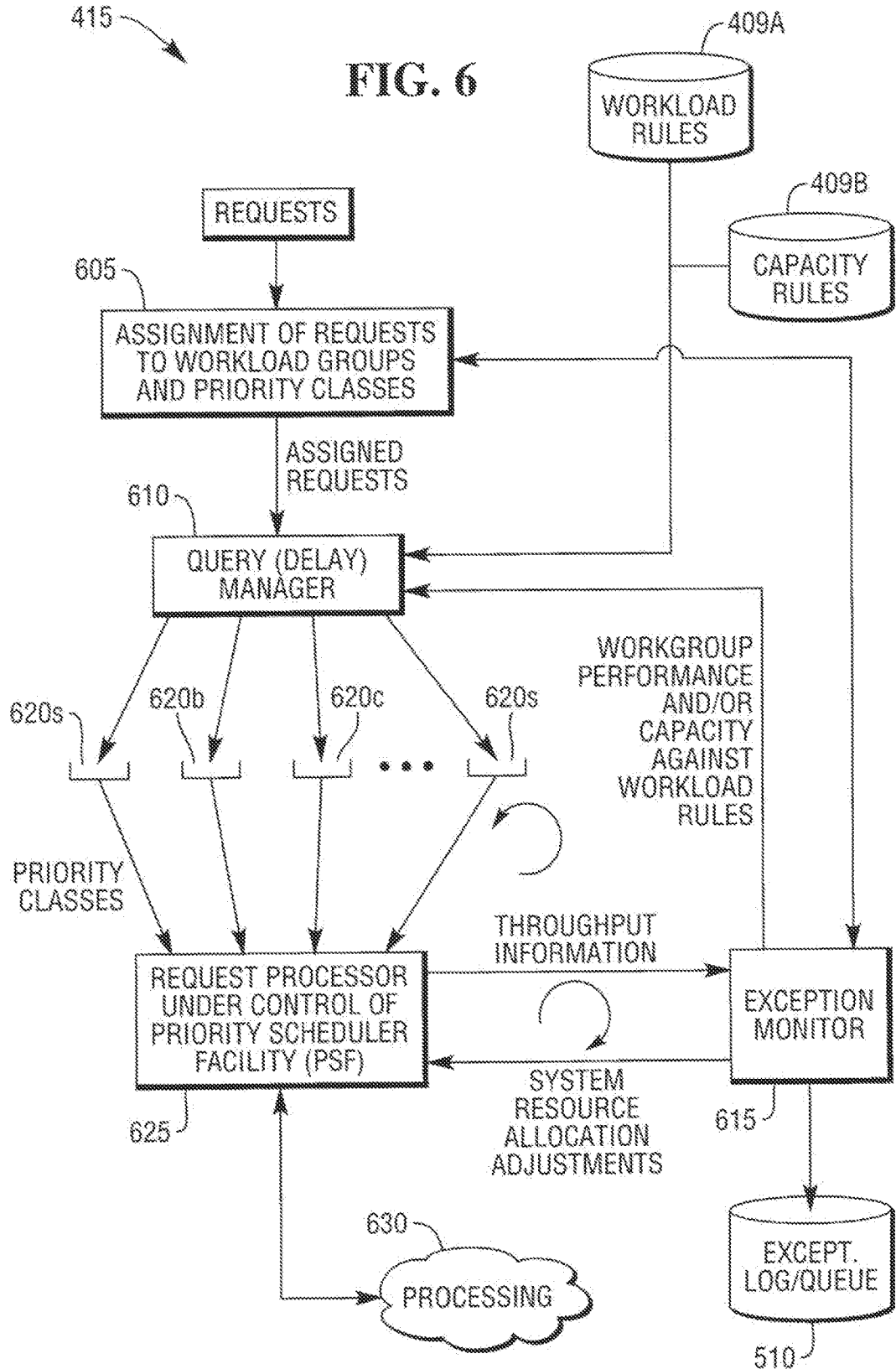
FIG. 6 depicts in greater detail the regulator in accordance with one embodiment of the invention.

FIG. 6 depicts in greater detail the regulator 415 in accordance with one embodiment of the invention. The regulator 415 can effectively regulate processing of requests based on current capacity and/or workload of a database by dynamically monitoring the capacity and workload characteristics using rules or other heuristics based on past and current performance of the system that guide two feedback mechanisms. It can do this before the request begins execution and at periodic intervals during query execution. Prior to query execution, the current capacity can be considered. Further, the workload characteristics of the query can be examined (e.g., an incoming request can be examined to determine in which workload group it belongs based on criteria).

As shown in FIG. 6, the regulator 415 can receive one or more requests, each of which can be assigned by an assignment process (block 605) to a workload group and, optionally, a priority class, in accordance with the workload rules 409a. The assigned requests can then be passed to a query (delay) manager 610. In addition, capacity rules and/or input 409b can be passed to the query (delay) manager 610. In general, the query (delay) manager 610 monitors the workload performance compared to the system capacity and/or the workload rules and either allows the request to be executed immediately or holds it for later execution, as described below. If the request is to be executed immediately, the query (delay) manager 610 places the request in the priority class bucket 620a-s corresponding to the priority class to which the request was assigned by the administrator 405. A request processor under control of a priority scheduler facility (PSF) 625 selects queries from the priority class buckets 620a-s, in an order determined by the priority associated with each of the buckets, and executes it, as represented by the processing block 630 on FIG. 6.

It should be noted that the query (delay) manager 610 and/or request processor under control of a priority scheduler facility (PSF) 625 can individually or collectively be operable to effectively delay processing of a request based on a current, a desired, or a target capacity. The request processor 625 can also monitor the request processing and report throughput information, for example, for each request and for each workgroup, to an exception monitoring process 615. The exception monitoring process 615 can compare the throughput with the workload rules 409 and can store any exceptions (e.g., throughput deviations from the workload rules) in the exception log/queue. In addition, the exception monitoring process 615 can provide system resource allocation adjustments to the request processor 625, which can adjust system resource allocation accordingly, e.g., by adjusting the priority scheduler weights. Further, the exception monitoring process 615 provides data regarding the workgroup performance against workload rules to the query (delay) manager 610, which can use the data to determine whether to delay incoming requests, depending on the workload group to which the request is assigned.

As shown in FIG. 6, the system provides two feedback loops, indicated by the circular arrows shown in the drawing. The first feedback loop includes the request processor 625 and the exception monitoring process 615. In this first feedback loop, the system monitors on a short-term basis the execution of requests to detect deviations greater than a short-term threshold from the defined service level for the workload group to which the requests were defined. If such deviations are detected, the DBMS is adjusted, e.g., by adjusting the assignment of system resources to workload groups. The second feedback loop includes the query (delay) manager 610, the request processor 625 and the exception monitoring process 615. In this second feedback loop, the system monitors on a long-term basis to detect deviations from the expected level of service greater than a long-term threshold. If it does, the system adjusts the execution of requests, e.g., by delaying, swapping out or aborting requests, to better provide the expected level of service. Note that swapping out requests is one form of memory control in the sense that before a request is swapped out it consumes memory and after it is swapped out it does not consume memory. While this is the preferable form of memory control, other forms, in which the amount of memory dedicated to an executing request can be adjusted as part of the feedback loop, are also possible.

Figure 7:
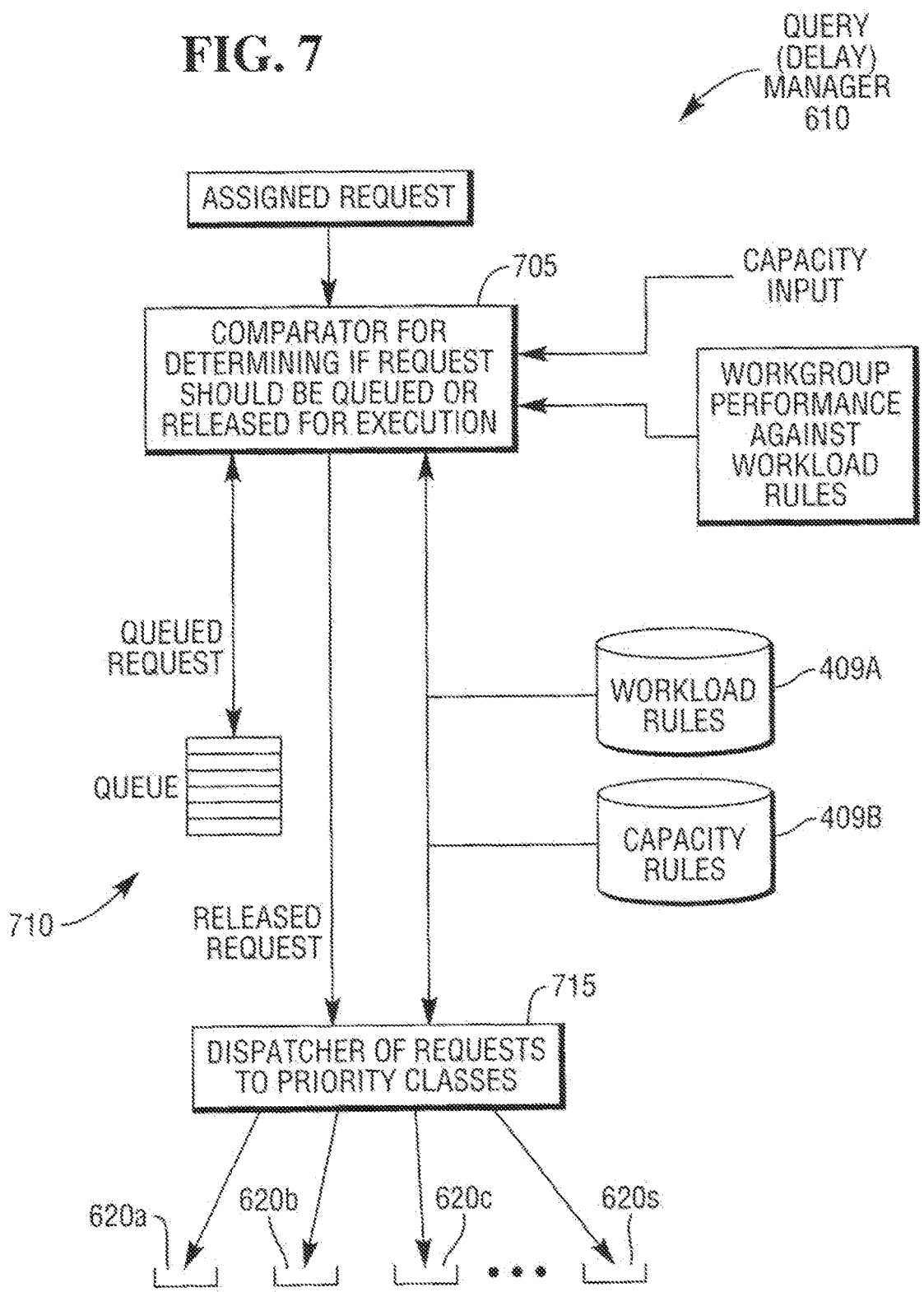
FIG. 7 depicts in greater detail query (delay) manager in accordance with one embodiment of the invention.

FIG. 7 depicts in greater detail query (delay) manager 610 (also shown in FIG. 6) in accordance with one embodiment of the invention. The query (delay) manager 610 receives an assigned request as an input. A comparator 705 determines if the request should be queued or released for execution. It does this based on the current or input capacity and/or by determining the workload group assignment for the request and comparing that workload group's performance against the workload rules, provided by the exception monitoring process 615. For example, the comparator 705 may examine the concurrency level of requests being executed under the workload group to which the request is assigned. Further, the comparator may compare the workload group's performance against other workload rules. If the comparator 705 determines that the request should not be executed, it places the request in a queue 710 along with any other requests for which execution has been delayed. The comparator 705 continues to monitor the workgroup's performance against the capacity and/or workload rules and when it reaches an acceptable level, it extracts the request from the queue 710 and releases the request for execution. In some cases, it may not be necessary for the request to be stored in the queue to wait for workgroup performance to reach a particular level, in which case it is released immediately for execution. Once a request is released for execution it is dispatched (block 715) to priority class buckets 620a-s, where it will await retrieval by the request processor 625.

Figure 8:
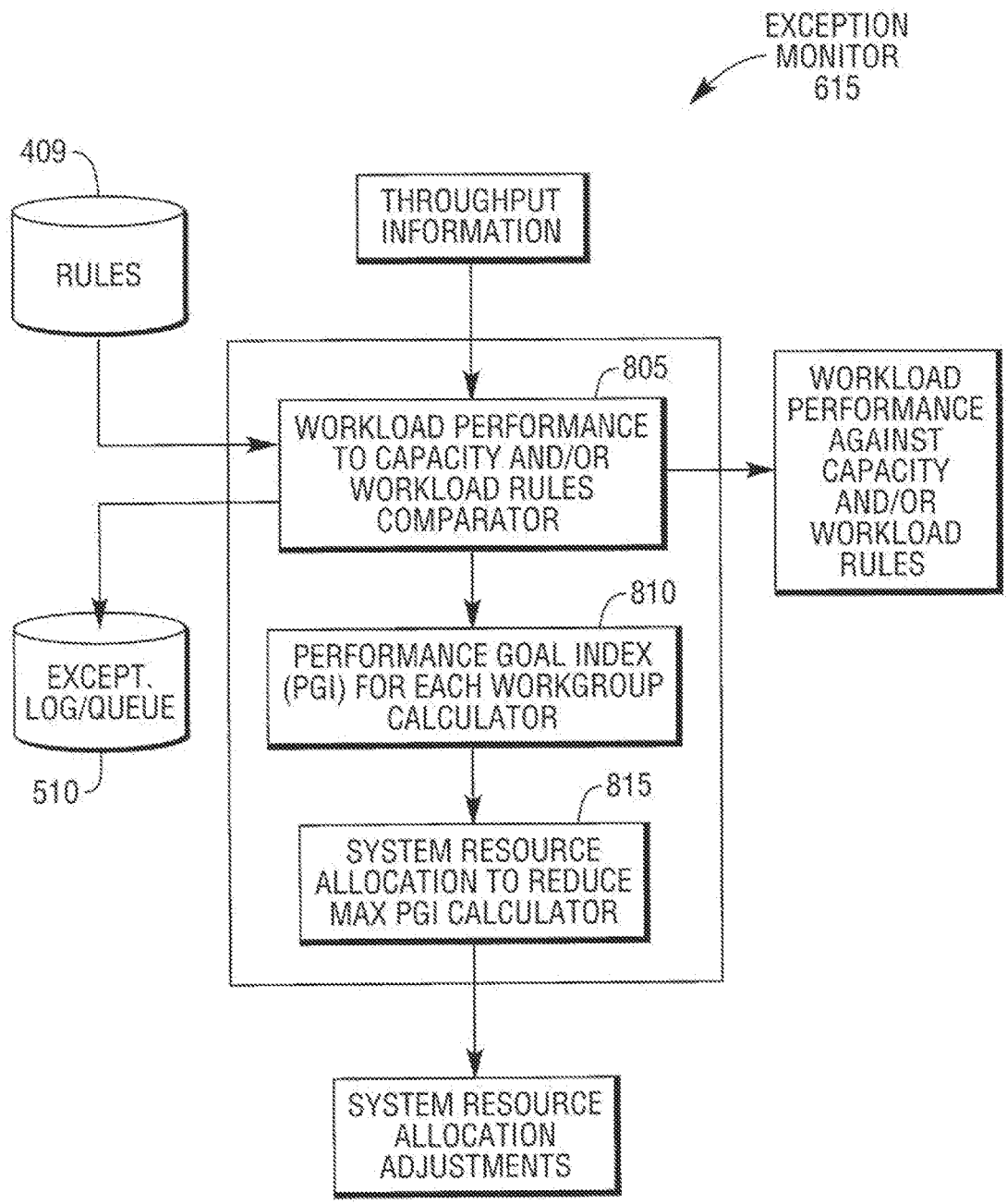
FIG. 8 depicts in greater detail an exception monitoring in accordance with one embodiment of the invention.

FIG. 8 depicts in greater detail an exception monitoring 615 in accordance with one embodiment of the invention. Exception monitoring 615 receives throughput information from the request processor 625. A workload performance to capacity and/or workload rules comparator 805 compares the received throughput information to the capacity rules and/or workload rules and logs any deviations that it finds in the exception log/queue 510. The capacity rules can effectively define performance for a workload at various capacities. The comparator 805 can also generate the workload performance against capacity and workload rules information which can be provided to the query (delay) manager 610. To determine what adjustments to the system resources are necessary, the exception monitoring process calculates a 'performance goal index' (PGI) for each workload group (block 810), where PGI is defined as the observed average response time (derived from the throughput information) divided by the response time goal (derived from the capacity and/or workload rules). Because it is normalized relative to the goal, the PGI is a useful indicator of performance that allows comparisons across workload groups. The exception monitoring process can adjust the allocation of system resources among the workload groups (block 815) using various techniques. For example, one technique is to minimize the maximum PGI for all workload groups for which defined goals exist. As another example, is to minimize the maximum PGI for the highest priority workload groups first, potentially at the expense of the lower priority workload groups, before minimizing the maximum PGI for the lower priority workload groups. These techniques can be specified by a DBA in advance through the administrator. An indication in the form of a system resource allocation adjustment is transmitted to the request processor 625. By seeking to minimize the maximum PGI for all workload groups, the system treats the overall workload of the system rather than simply attempting to improve performance for a single workload. In most cases, the system will reject a solution that reduces the PGI for one workload group while rendering the PGI for another workload group unacceptable. This approach means that the system does not have to maintain specific response times very accurately. Rather, it only needs to determine the correct relative or average response times when comparing between different workload groups.

Figure 9A:
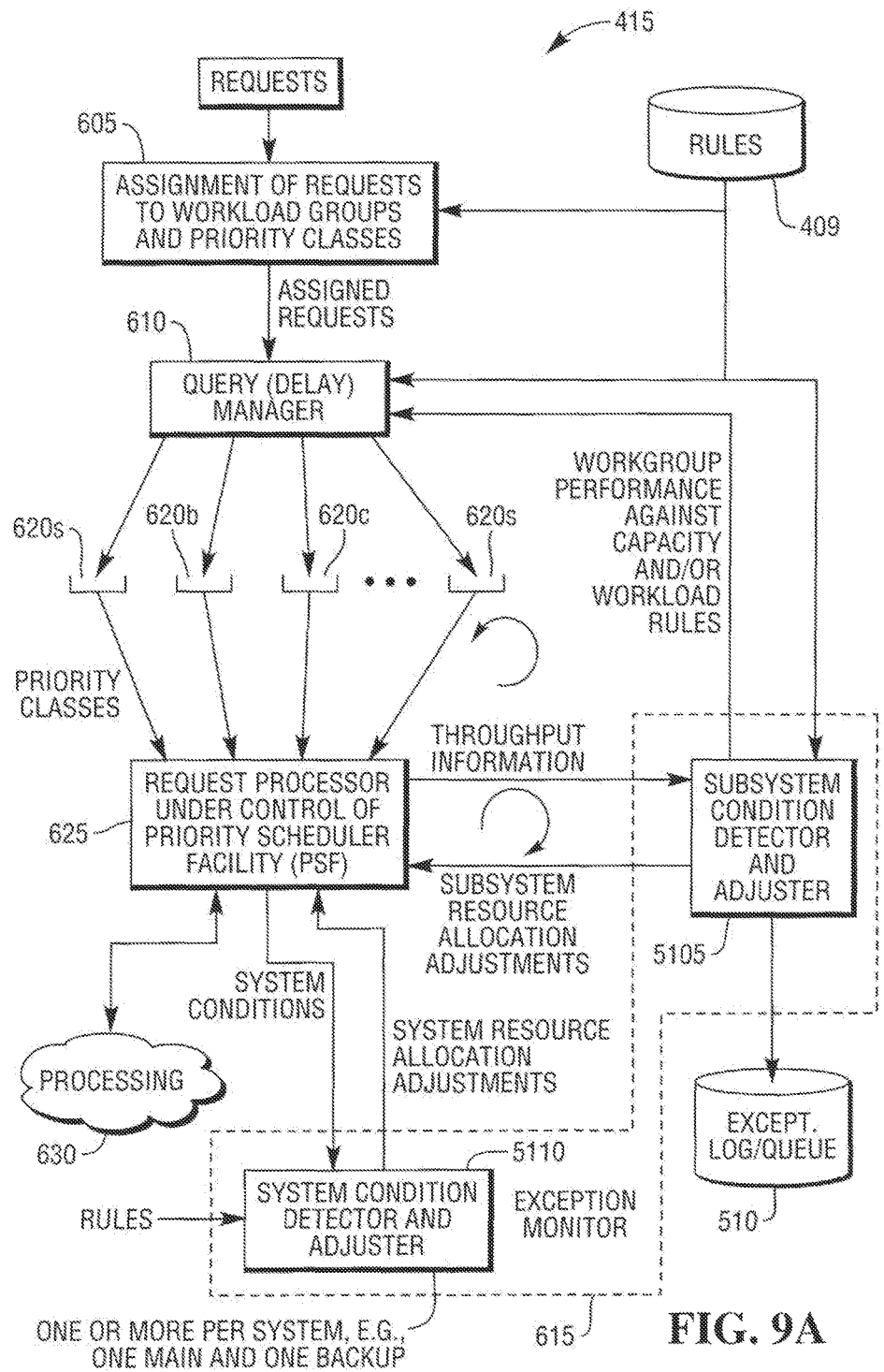
FIG. 9A depicts in greater detail an exception monitor as a part of a regulator in accordance with one embodiment of the invention.

FIG. 9A depicts in greater detail an exception monitor 615 as a part of a regulator 415 in accordance with one embodiment of the invention. Exception monitor 615 includes a subsystem condition detector and adjuster (SSCDA) 5105 and a system condition detector and adjuster (SCDA) 5110. As shown in FIG. 9A, in one example system there is one SCDA 5110 for the entire system. In some example systems, one or more backup SCDAs (not shown) are also provided that will operate in the event that SCDA 5110 malfunctions.

Figure 9B:
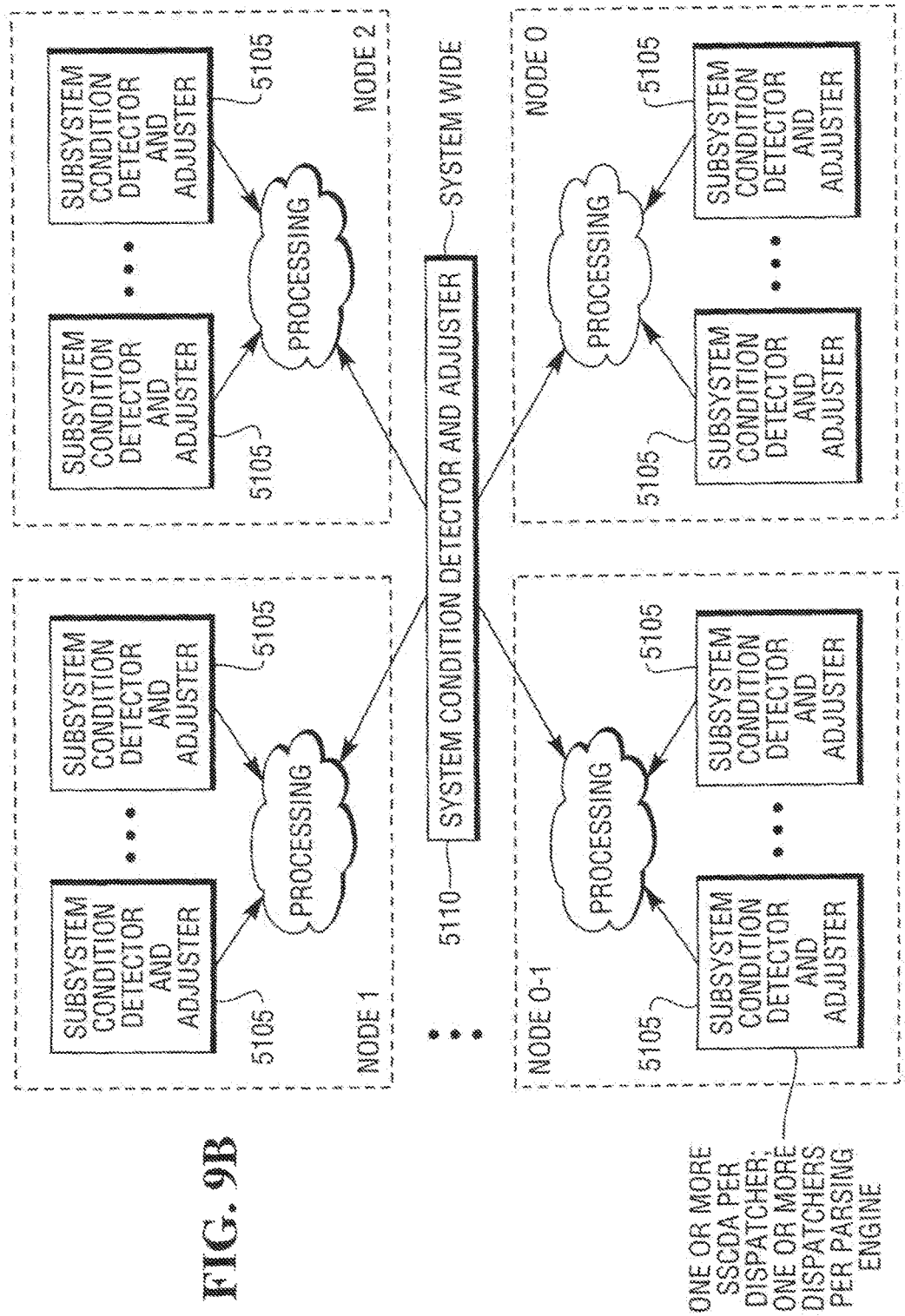
FIG. 9B depicts a subsystem condition detector and adjuster (SSCDA) and a system condition detector and adjuster (SCDA) in accordance with one embodiment of the invention.

As shown in FIG. 9B, there can be one SSCDA 5105 per dispatcher. However, more than one SSCDA 5105 per dispatcher can be provided. In addition, some systems may have only one dispatcher per parsing engine, although this is not a limitation of the concept described herein. Further, in some systems each parsing engine may run on a single node or across multiple nodes. In some example systems, each node will include a single parsing engine. Thus, for example, there may be one SSCDA per AMP, one per parsing engine, or one per node.

Returning to FIG. 9A, the SCDA monitors and controls resource consumption at the system level, while the SSCDA monitors and controls resource consumption at the subsystem level, where in some example systems, a subsystem corresponds with a single dispatcher. Some subsystems may correspond to a share of a dispatcher. Further, a subsystem may correspond to more than one dispatcher. Each SSCDA monitors and controls, in a closed loop fashion, resource consumption associated with a single subsystem. An SSCDA monitors throughput information that it receives from the request processor 625 and compares that performance information to the workload rules 409. The SSCDA then adjusts the resource allocation in the request processor 625 to better meet the workload rules.

The SCDA receives system conditions, compares the conditions to the workload rules, and adjusts the system resource allocations to better meet the system conditions. For convenience, FIG. 9A shows the SCDA receiving inputs from and sending outputs to the request processor 625. In another exemplary system, the inputs and outputs to and from the SCDA are handled as described below with respect to FIG. 9C.

Generally, the SSCDA provides real-time closed-loop control over subsystem resource allocation with the loop having a fairly broad bandwidth. The SCDA provides real-time closed-loop control over system resource allocation with the loop having a narrower bandwidth. The SCDA provides real-time closed-loop control over system resource allocation with the loop having a narrower bandwidth. Further, while the SSCDA controls subsystem resources and the SCDA controls system resources, in many cases subsystem resources and system resources are the same. The SCDA has a higher level view of the state of resource allocation because it is aware, at some level as discussed with respect to FIG. 9C, of the state of resource allocation of all subsystems, while each SSCDA is generally only aware of the state of its own resource allocation. A system may include some resources that are shared at a system level. Such resources would be truly system resources controlled by the SCDA.

One example of the way that the SCDA 5110 may monitor and control system resource allocations is illustrated in FIG. 9C. The SSCDAs are arranged in a tree structure, with one SSCDA (the root SSCDA 5305) at the top of the tree, one or more SSCDAs (leaf SSCDAs, e.g. leaf SSCDA 5310) at the bottom of the tree, and one or more intermediate SSCDAs (e.g. intermediate SSCDA 5315) between the root SSCDA and the leaf SSCDAs. Each SSCDA, except the root SSCDA 5305, has a parent SSCDA (i.e. the immediately-higher SSCDA in the tree) and each SSCDA, except the leaf SSCDA, has one or more child SSCDA (i.e. the immediately lower SSCDA in the tree). For example, in FIG. 9C, SSCDA 5315 is the parent of SSCDA 5310 and the child of SSCDA 5320.

In the example shown in FIG. 9C, the tree is a binary tree. It will be understood that other types of trees will fall within the scope of the appended claims. Further, while the tree in FIG. 9C is symmetrical, symmetry is not a limitation. The SCDA 5110 gathers system resource information by broadcasting to all SSCDAs a request that they report their current resource consumption. In one example system, each SSCDA gathers the information related to its resource consumption, as well as that of its children SSCDAs, and reports the compiled resource consumption information to its parent SSCDA. In one example system, each SSCDA waits until it has received resource consumption information from its children before forwarding the compiled resource consumption information to its parent. In that way, the resource consumption information is compiled from the bottom of the tree to the top. When the root SSCDA 5305 compiles its resource consumption information with that which is reported to it by its children SSCDAs, it will have complete resource consumption information for the SSCDAs in the system. The root SSCDA 5305 will report that complete information to the SCDA. The SCDA will add to that information any resource consumption information that is available only at the system level and make its resource allocation adjustments based on those two sets of information.

In another exemplary system, each of the SSCDAs communicates its resource consumption information directly to the SCDA 5110. The SCDA 5110 compiles the information it receives from the SSCDAs, adds system level resource consumption information, to the extent there is any, and makes its resource allocation adjustments based on the resulting set of information.

There are at least two ways by which the SCDA 5110 can implement its adjustments to the allocation of system resources. The first, illustrated in FIG. 9A, is for the SCDA 5110 to communicate such adjustments to the request processor 625. The request processor 625 implements the adjustments to accomplish the resource allocation adjustments.

Alternatively, the SCDA 5110 can communicate its adjustments to the SSCDAs in the system, either directly or by passing them down the tree illustrated in FIG. 53. In either case, the SSCDAs incorporate the SCDA's resource allocation adjustments in the subsystem resource allocation adjustments that it sends to the request processor 625.

Capacity Management for Multi-Node, Parallel Database Systems

Figure 10:
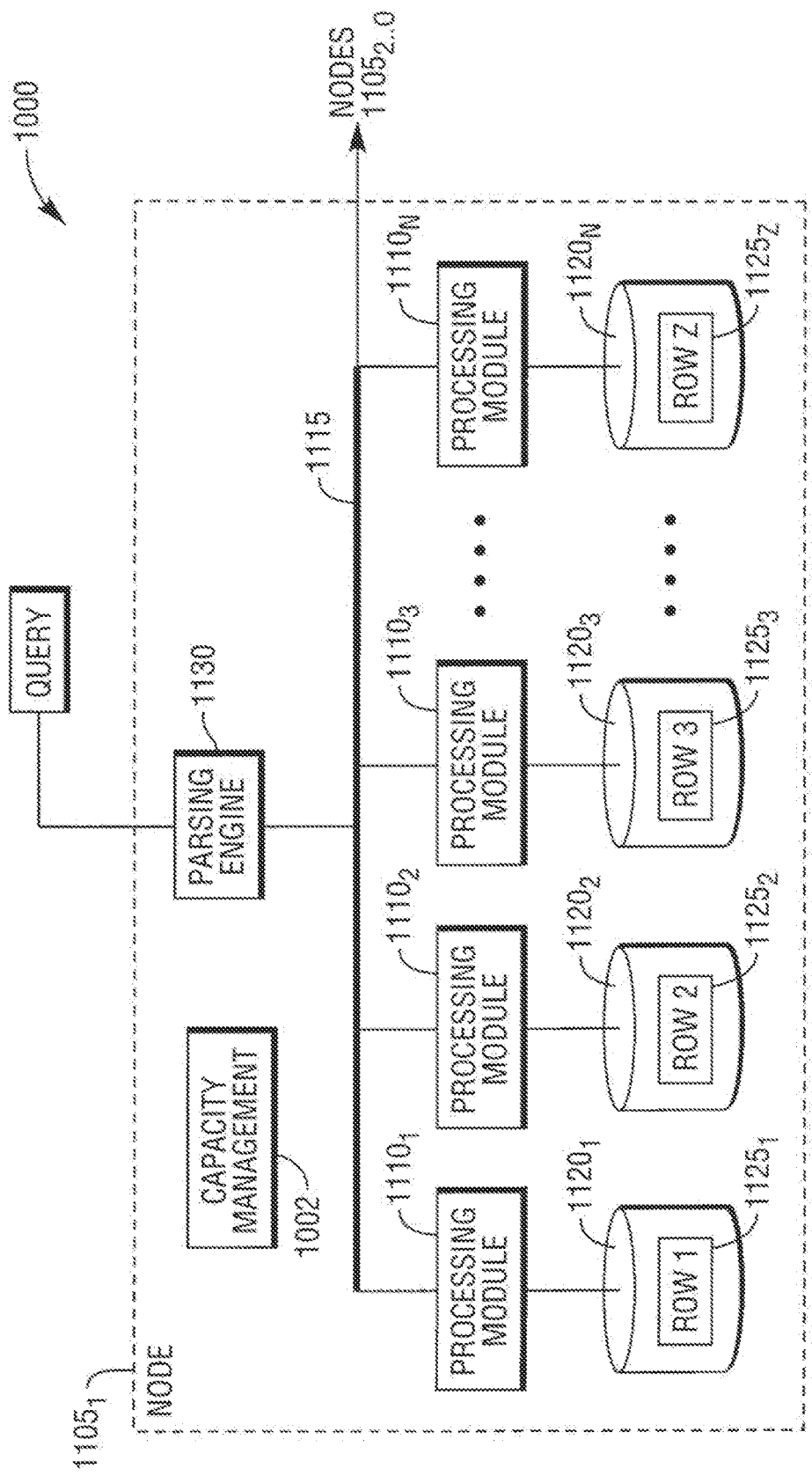
FIG. 10 depicts a database node of a database system or database management system (DBMS) in accordance with one embodiment of the invention.

The techniques described above are especially suitable for multi-node, parallel databases, including those that use a massively parallel processing (MPP) architecture or system. To further elaborate FIG. 10 depicts a database node 1105 of a database system or database management system (DBMS) 1000 in accordance with one embodiment of the invention. The database system 1000 can, for example, be provided as a Teradata Active Data Warehousing System. FIG. 10 depicts an exemplary architecture for one database node 1105$_1$ of the DBMS 100 in accordance with one embodiment of the invention. The DBMS node 1105$_1$ includes one or more processing modules 1110-N connected by a network 1115, that manage the storage and retrieval of data in data-storage facilities 1120$_{1-N}$. Each of the processing modules 1110-N represent one or more physical processors or virtual processors, with one or more virtual processors (e.g., Access Module Processer (AMP)) running on one or more physical processors.

For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there are four (4) virtual processors and four (4) physical processors, then typically each virtual processor would run on its own physical processor. If there are 8 virtual processors and 4 physical processors, the operating system would schedule the eight (8) virtual processors against the four (4) physical processors, in which case swapping of the virtual processors would occur. Each of the processing modules 1110$_{1-N}$ manages a portion of a database stored in a corresponding one of the data-storage facilities 120$_{1-N}$. Each of the data-storage facilities 1120$_{1-N}$ can includes one or more storage devices (e.g., disk drives). The DBMS 1000 may include additional database nodes 1105$_{2-O}$ in addition to the node 1105$_1$. The additional database nodes 1105$_{2-O}$ are connected by extending the network 1115. Data can be stored in one or more tables in the data-storage facilities 1120$_{1-N}$. The rows 1125$_{1-z}$ of the tables can be stored across multiple data-storage facilities 1120$_{1-N}$ to ensure that workload is distributed evenly across the processing modules 1110$_{1-N}$. A parsing engine 1130 organizes the storage of data and the distribution of table rows 1125$_{1-z}$ among the processing modules 1110$_{1-N}$. The parsing engine 1130 also coordinates the retrieval of data from the data-storage facilities 1120$_{1-N}$ in response to queries received, for example, from a user. The DBMS 1000 usually receives queries and commands to build tables in a standard format, such as SQL.

In one implementation, the rows 1125$_{1-z}$ are distributed across the data-storage facilities 1120$_{1-N}$ by the parsing engine 1130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities 1120$_{1-N}$ and associated processing modules 1110$_{1-N}$ by a hash bucket map. The characteristics of the columns chosen for the primary index determine how evenly the rows are distributed.

Referring to FIG. 10, it should be noted that a capacity management node component 1002 can be provided as a separate entity (or component, or module) or can be at least partially implemented in the parsing engine 1130. In addition, a capacity management central component 1004 can be provided as a central component that can effectively coordinate and/or manage the capacity of the DBMS 1000.

Figure 11:
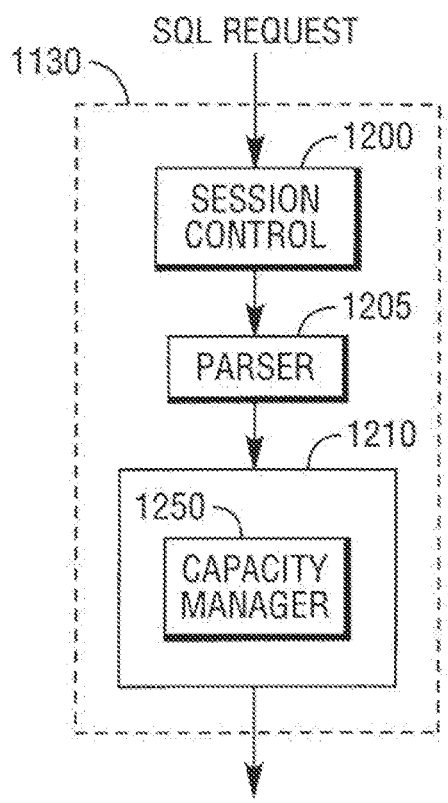
FIG. 11 depicts a Parsing Engine (PE) in accordance with one embodiment of the invention.

In one exemplary system, the parsing engine 1130 is made up of three components: a session control 1200, a parser 1205, and a dispatcher 1210, as shown in FIG. 11. The session control 1200 provides the logon and logoff function. It accepts a request for authorization to access the database, verifies it, and then either allows or disallows the access. When the session control 1200 allows a session to begin, a user may submit a SQL request, which is routed to the parser 1205. Regarding the dispatcher 1210, it should be noted that some monitoring functionality for capacity and workload management may be performed by a regulator (e.g., regulator 415). The Regulator can monitor capacity and workloads internally. It can, for example, do this by using internal messages sent from the AMPs to the dispatcher 1210. The dispatcher 1210 provides an internal status of every session and request running on the system. It does this by using internal messages sent from the AMPs to the dispatcher 1210. The dispatcher 1210 provides an internal status of every session and request running on the system. As such, at least part of a capacity management system (capacity management 1250) can be provided by the dispatcher 1210 which operates as a capacity and workload enhanced dispatcher in order to effectively manage capacity and/or workload in the DBMS 1000.

Figure 12:
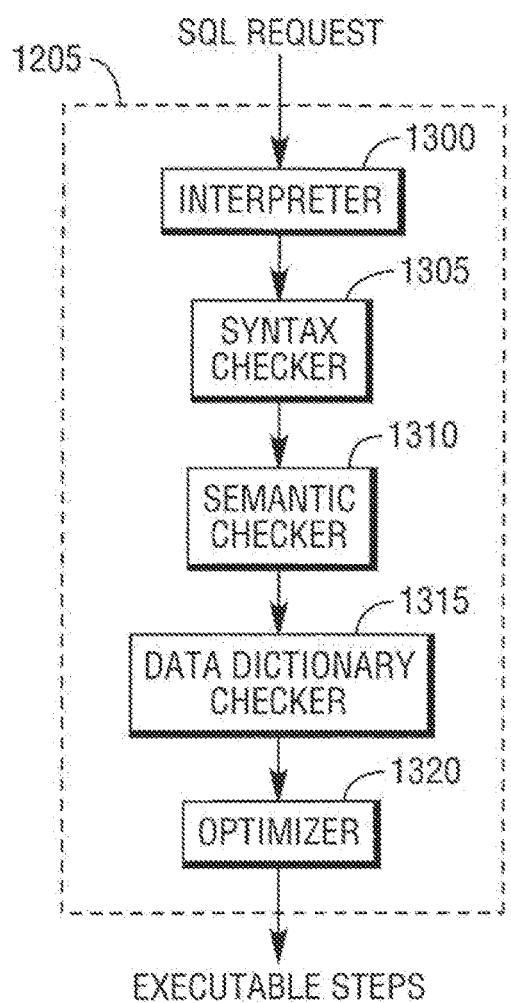
FIG. 12 depicts a Parser in accordance with one embodiment of the invention.

As illustrated in FIG. 12, the parser 1205 interprets the SQL request (block 1300), checks it for proper SQL syntax (block 1305), evaluates it semantically (block 1310), and consults a data dictionary to ensure that all of the objects specified in the SQL request actually exist and that the user has the authority to perform the request (block 1305). Finally, the parser 1205 runs an optimizer (block 1320), which generates the least expensive plan to perform the request.

System conditions that can be considered by DBMS can, for example, include: Memory—the amount of system and subsystem memory currently being used. It is possible that the system will include some memory that is shared among all of the subsystems. AMP worker tasks (AWT)—the number of available AWTs. An AWT is a thread or task within an AMP for performing the work assigned by a dispatcher. Each AMP has a predetermined number of AWTs in a pool available for processing. When a task is assigned to an AMP, one or more AWTs are assigned to complete the task. When the task is complete, the AWTs are released back into the pool. As an AMP is assigned tasks to perform, its available AWTs are reduced. As it completes tasks, its available AWTs are increased. FSG Cache—the amount of FSG cache that has been consumed. The FSG cache is physical memory that buffers data as it is being sent to or from the data storage facilities. Arrival Rates—the rate at which requests are arriving. Arrival rate can be broken down and used as a resource management tool at the workload basis. Co-existence—the co-existence of multiple types of hardware. Skew—the degree to which data (and therefore processing) is concentrated in one or more AMPs as compared to the other AMPs. Blocking (Locking)—the degree to which data access is blocked or locked because other processes are accessing data. Spool—the degree of consumption of disk space allocated to temporary storage. CPU—the number of instructions used per second. I/O—the datablock I/O transfer rate. Bynet latency—the amount of time necessary for a broadcast message to reach its destination.

The techniques for communication between the SCDA 5110 and the SSCDAs can, for example, be accomplished by a single process running across all of the nodes and all of the AMPS, by multiple processes, where each process executes on a separate AMP, or by processes that can run on more than one, but not all, of the AMPs. "Process" should be interpreted to mean any or all of these configurations.

Since the SCDA 5110 has access to the resource consumption information from all SSCDAs, it can make resource allocation adjustments that are mindful of meeting the system workload rules. It can, for example, adjust the resources allocated to a particular workload group on a system-wide basis, to make sure that the workload rules for that workload group are met. It can identify bottlenecks in performance and allocate resources to alleviate the bottleneck. It can remove resources from a workload group that is idling system resources. In general, the SCDA 5110 provides a system view of meeting workload rules while the SSCDAs provide a subsystem view.

Additional techniques related to controlling the capacity of a database system are further discussed in the following two (2) U.S. patent applications which are both hereby incorporated by reference herein for all purposes: (i) U.S. patent application Ser. No. 13/250,150 entitled: "MANAGING EXCESS CAPACITY OF DATABASE SYSTEMS IN A CAPACITY CONTROLLED COMPUTING ENVIRONMENT," by LOUIS BURGER et al., (ii) U.S. patent application Ser. No. 13/250,006 entitled: "MANAGING CAPACITY OF COMPUTING ENVIRONMENTS AND SYSTEM THAT INCLUDE A DATABASE," by JOHN MARK MORRIS et al.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of managing computing capacity of a computing system in relation to a target capacity of the computing system, wherein the computing system includes at least one physical processor, and wherein the computer-implemented method comprises:
    determining at least partly based on the target capacity of the computing system and a first average measured processing capacity of the at least one processor taken over a first period of time, whether to change processing capacity of the at least one physical processor from a first processing capacity to a different processing capacity;
    changing the processing capacity of the at least one physical processor from the first processing capacity to a second processing capacity which is different than the first processing capacity when the determining determines to change the processing capacity of the at least one physical processor from the first processing capacity to a different processing capacity at least partly based on the target capacity of the computing system and average measured processing capacity of the at least one processor;
    thereafter, obtaining a second average measurement of the processing rate of the at least one processor over a second period of time that includes the time the at least one processor has been operating at the second processing rate since the processing rate was changed to the second processing rate;
    comparing the second measurement of the processing rate to the target processing rate, wherein the target processing rate is determined at last based on a calculated performance goal for the computing system related to an observed average response time and one or more capacity workload rules for processing requests from users of the computing system;
    determining, at least partly based on the target capacity of the computing system and the second average measured processing capacity of the at least one processor taken over the second period of time, whether to switch the processing rate of the at least one processor from the second processing rate back to the first processing rate; and
    switching the processing rate of the at least one processor from the second processing rate back to the first processing rate when the determining determines to switch the processing rate.

2. The computer-implemented method of claim 1, wherein the processing capacity includes a maximum processing rate indicative of maximum processing rate of the at least one processor.

3. The computer-implemented method of claim 2, wherein the maximum processing rate is at least one of: an actual processing, and an effective processing rate achieved by skipping one or more actual clock cycles.

4. The computer-implemented method of claim 1, wherein the computing system includes a database system with the at least one processor operable to process data for a database, and wherein the changing of the processing capacity of the at least one processor is performed when the database system is processing the data for the database.

5. The computer-implemented method of claim 4, wherein the changing of the processing capacity of the at least one processor is performed despite the demand for processing of data by the database.

6. The computer-implemented method of claim 1, wherein the changing of the processing capacity of the at least one processor causes the at least one processor to effectively operate over a second time period at a processing rate that is not configured for the at least one processor.

7. The computer-implemented method of claim 1, wherein the changing of the processing capacity of the at least one processor is made at least partly based on a measured average of the processing rates of the at least one processors over a second period of time when the at least one processor operates at two different processing rates.

8. The computer-implemented method of claim 1, wherein the computer-implemented method further comprises: adjusting the target capacity of computing system.

9. The computer-implemented method of claim 8, wherein the computing system includes a database system, and wherein the adjusting the target capacity of computing system comprises adjusting a target capacity of the database system by a value agreed upon by at least a customer and a vendor of the database system.

10. The computer-implemented method of claim 1, wherein the computer-implemented method further comprises: measuring the capacity of computing system.

11. The computer-implemented method of claim 10, wherein the computing system includes a database system, and wherein the computer-implemented method further comprises billing cost of capacity of the database system to a customer of the database system.

12. A device that includes one or more physical processors, wherein the one or more processor are operable to:
  determine at least partly based on a target capacity associated with a computing environment and a first average measured processing capacity of the at least one processor taken over a first period of time, whether to change processing capacity of at least one physical processor in the computing environment from a first processing capacity to a different processing capacity;
  change the processing capacity of the at least one physical processor from the first processing capacity to a second processing capacity which is different than the first processing capacity when the determining determines to change the processing capacity of the at least one physical processor from the first processing capacity to a different processing capacity;
  thereafter, obtain a second average measurement of the processing rate of the at least one processor over a second period of time that includes the time the at least one processor has been operating at the second processing rate since the processing rate was changed to the second processing rate;
  compare the second measurement of the processing rate to the target processing rate, wherein the target processing rate is determined at last based on a calculated performance goal for the computing system related to an observed average response time and one or more capacity workload rules for processing requests from users of the computing system;
  determine, at least partly based on the target capacity of the computing system and the second average measured processing capacity of the at least one processor taken over the second period of time, whether to switch the processing rate of the at least one processor from the second processing rate back to the first processing rate; and
  switch the processing rate of the at least one processor from the second processing rate back to the first processing rate when the determining determines to switch the processing rate.

13. The device of claim 12, wherein the one or more physical processor are further operable to: determine at least partly based on the target capacity of the computing system and a measured processing capacity of the at least one physical processor, whether to change the processing capacity of the at least one physical processor from the first processing capacity to a different processing capacity, and wherein the measured processing capacity includes a measurement of the processing capacity of the at least one physical processor over at least a first period of time.

14. The device of claim 12, wherein the one or more physical processor are further operable to: obtain a first measurement of the processing rate of the at least one physical processor over a first period of time; compare the first measurement of the processing rate to a target processing rate associated with the target capacity of the computing system; increase or decrease at least one current processing rate of the at least one physical processor based on the comparison of the first measurement of the processing rate to the target processing.

15. A non-transitory computer readable storage medium storing at least executable code operable to manage computing capacity of a computing system in relation to a target capacity of the computing system, wherein the computing system includes at least one processor, and wherein the executable code includes:
  executable code that when executed determines at least partly based on the target capacity of the computing system and a first average measured processing capacity of the at least one processor taken over a first period of time, whether to change processing capacity of the at least one processor from a first processing capacity to a different processing capacity;
  executable code that when executed changes the processing capacity of the at least one processor from the first processing capacity to a second processing capacity which is different than the first processing capacity when the determining determines to change the processing capacity of the at least one processor from the first processing capacity to a different processing capacity
  executable code that when executed obtains a second average measurement of the processing rate of the at least one processor over a second period of time that includes the time the at least one processor has been operating at the second processing rate since the processing rate was changed to the second processing rate;
  executable code that when executed compares the second measurement of the processing rate to the target processing rate, wherein the target processing rate is determined at last based on a calculated performance goal for the computing system related to an observed average response time and one or more capacity workload rules for processing requests from users of the computing system;
  executable code that when executed determines, at least partly based on the target capacity of the computing system and the second average measured processing capacity of the at least one processor taken over the second period of time, whether to switch the processing rate of the at least one processor from the second processing rate back to the first processing rate; and
  executable code that when executed switches the processing rate of the at least one processor from the second processing rate back to the first processing rate when the determining determines to switch the processing rate.

16. The non-transitory computer readable storage medium of claim 15, wherein the processing capacity includes a maximum processing rate indicative of maximum processing rate of the at least one processor.

17. The non-transitory computer readable storage medium of claim 16, wherein the maximum is at least one of: an actual processing, and an effective processing rate achieved by skipping one or more actual clock cycles.

* * * * *